United States Patent
Hashimoto et al.

(10) Patent No.: US 12,202,597 B2
(45) Date of Patent: Jan. 21, 2025

(54) CONTROL DEVICE FOR ELECTRIC VERTICAL TAKEOFF AND LANDING AIRCRAFT

(71) Applicant: DENSO CORPORATION, Kariya (JP)

(72) Inventors: Mariko Hashimoto, Kariya (JP); Akira Iwakawa, Kariya (JP); Syun Sugita, Kariya (JP); Yuuichi Takemura, Kariya (JP)

(73) Assignee: DENSO CORPORATION, Kariya (JP)

( * ) Notice: Subject to any disclaimer, the term of this patent is extended or adjusted under 35 U.S.C. 154(b) by 197 days.

(21) Appl. No.: 17/678,170

(22) Filed: Feb. 23, 2022

(65) Prior Publication Data

US 2022/0177123 A1    Jun. 9, 2022

Related U.S. Application Data

(63) Continuation of application No. PCT/JP2020/031007, filed on Aug. 17, 2020.

(30) Foreign Application Priority Data

Aug. 28, 2019  (JP) .................................. 2019-155475
Aug. 29, 2019  (JP) .................................. 2019-156466

(51) Int. Cl.
*B64C 29/00*        (2006.01)
*B64D 27/24*        (2024.01)
(Continued)

(52) U.S. Cl.
CPC .......... *B64C 29/0025* (2013.01); *B64D 27/24* (2013.01); *B64D 31/10* (2013.01); *B64F 5/60* (2017.01)

(58) Field of Classification Search
CPC ..... B64C 29/0025; B64C 27/22; B64C 27/72; B64C 29/00; B64D 27/24; B64D 31/10; B64D 31/06; B64F 5/60
See application file for complete search history.

(56) References Cited

U.S. PATENT DOCUMENTS 5,023,791 A  *  6/1991  Herzberg ........... G05B 23/0283
                                                  324/73.1
5,115,996 A  *  5/1992  Moller ................ B64C 29/0025
                                                  D12/326

(Continued)

FOREIGN PATENT DOCUMENTS

DE         102019207806 A1  *  12/2020

OTHER PUBLICATIONS

Nov. 2, 2020 Search Report issued in International Patent Application No. PCT/JP2020/031007.

*Primary Examiner* — Donald J Wallace
*Assistant Examiner* — Jalal C Coduroglu
(74) *Attorney, Agent, or Firm* — Oliff PLC

(57) ABSTRACT

A control device controls an electric drive system mounted on an electric vertical takeoff and landing aircraft with a rotor, and including a drive motor that turns the rotor. The control device controls the electric drive system to operate selectively in any one operation mode of at least two operation modes: a normal mode and a functional test mode. In the normal mode, the control device controls the drive motor in accordance with a command from a body control device that controls the flight of the electric vertical takeoff and landing aircraft. In the functional test mode, the control device controls the drive motor in accordance with a command sent from outside according to a functional test program, or in accordance with the functional test program preset in the control device.

19 Claims, 16 Drawing Sheets

(51) Int. Cl.
 *B64D 31/10* (2006.01)
 *B64F 5/60* (2017.01)

(56) References Cited

U.S. PATENT DOCUMENTS

| | | | | |
|---|---|---|---|---|
| 5,260,874 | A * | 11/1993 | Berner | G09B 9/24 |
| | | | | 434/242 |
| 10,273,021 | B1 | 4/2019 | Selwa et al. | |
| 2003/0071165 | A1* | 4/2003 | Fiebick | F41G 7/007 |
| | | | | 342/25 R |
| 2007/0014681 | A1* | 1/2007 | Beaudoin | F01C 1/02 |
| | | | | 418/61.2 |
| 2008/0091309 | A1* | 4/2008 | Walker | B60R 25/102 |
| | | | | 701/1 |
| 2008/0303543 | A1* | 12/2008 | Cop | G01R 31/343 |
| | | | | 324/765.01 |
| 2009/0157236 | A1* | 6/2009 | Van Gaasbeck | G05B 15/02 |
| | | | | 701/3 |
| 2014/0138477 | A1 | 5/2014 | Keennon et al. | |
| 2016/0244187 | A1 | 8/2016 | Byers et al. | |
| 2016/0246304 | A1* | 8/2016 | Canoy | G05D 1/0011 |
| 2016/0376031 | A1* | 12/2016 | Michalski | G05D 1/652 |
| | | | | 701/15 |
| 2017/0234773 | A1* | 8/2017 | DeMarco | G01M 15/02 |
| | | | | 73/112.01 |
| 2017/0313433 | A1* | 11/2017 | Ozaki | B64D 27/24 |
| 2018/0134400 | A1* | 5/2018 | Knapp | B64D 41/007 |
| 2018/0334251 | A1* | 11/2018 | Karem | B64C 13/18 |
| 2019/0054939 | A1* | 2/2019 | Kono | B61L 5/102 |
| 2019/0061964 | A1* | 2/2019 | Murrow | B64C 29/00 |
| 2019/0144116 | A1 | 5/2019 | Yuan | |
| 2019/0389595 | A1* | 12/2019 | Selwa | B64D 45/00 |
| 2020/0348698 | A1* | 11/2020 | Wake | B64D 27/24 |
| 2022/0126987 | A1* | 4/2022 | Cox | B64C 25/405 |

* cited by examiner

CONTROL DEVICE FOR ELECTRIC VERTICAL TAKEOFF AND LANDING AIRCRAFT

CROSS-REFERENCE TO RELATED APPLICATION

This application is the U.S. bypass application of International Application No. PCT/JP2020/031007 filed on Aug. 17, 2020 which designated the U.S. and claims the benefit of priority from earlier Japanese Patent Applications No. 2019-156466 filed on Aug. 29, 2019, and No. 2019-155475 filed on Aug. 28, 2019, the entire descriptions of both of which are incorporated herein by reference.

TECHNICAL FIELD

The present disclosure relates to a control device for an electric vertical takeoff and landing aircraft.

BACKGROUND

In recent years, manned or unmanned aircrafts referred to as electric vertical takeoff and landing aircrafts (eVTOLs) have been developed increasingly as aircrafts different from airplanes equipped with a gas turbine engine. An electric vertical takeoff and landing aircraft includes a plurality of electric drive systems (EDSs) each including a motor, and the multiple motors turn multiple rotors to produce lift and thrust for the aircraft body. After each electric drive system is replaced or inspected, it is desirable to perform a functional test of whether the electric drive system operates normally, and the rotor turns. JP 2017-146299 A discloses a method for analyzing the functions of a gas turbine engine. Like gas turbine engines, the electric drive systems of electric vertical takeoff and landing aircrafts are also to be subjected to a functional test at the time of replacement or periodical inspection.

SUMMARY

An aspect of the present disclosure provides a control device for an electric vertical takeoff and landing aircraft. The control device is used for an electric drive system mounted on an electric vertical takeoff and landing aircraft with a rotor, and including a drive motor that turns the rotor. The control device controls the drive motor to operate selectively in any one operation mode of at least two operation modes: a normal mode and a functional test mode. In the normal mode, the control device controls the drive motor in accordance with a command from a body control device that controls the flight of the electric vertical takeoff and landing aircraft. In the functional test mode, the control device controls the drive motor in accordance with a command sent from outside according to a functional test program, or in accordance with the functional test program preset in the control device.

BRIEF DESCRIPTION OF THE DRAWINGS

The above features of the present disclosure will be made clearer by the following detailed description, given referring to the appended drawings. In the accompanying drawings.

DETAILED DESCRIPTION OF THE PREFERRED EMBODIMENTS

An electric vertical takeoff and landing aircraft can take off or land at a smaller site compared with a fixed wing aircraft with a gas turbine engine, and may thus be used in various places. On the other hand, a functional test for electric drive systems needs a special control that causes a rotor to perform a test rotation, and will thus be performed, like an airplane with a gas turbine engine, at an examination site on which dedicated facilities such as a computer are installed for execution of such control. In response to these circumstances, the present inventors consider that it is inefficient to move an electric vertical takeoff and landing aircraft from a place for use to an examination site for the purpose of performing a functional test. Thus, there is a desire for a technique that allows a functional test of electric drive systems at a place for use of an electric vertical takeoff and landing aircraft.

The present disclosure may be embodied in the aspects described below.

An aspect of the present disclosure provides a control device for an electric vertical takeoff and landing aircraft. The control device is used for an electric drive system mounted on an electric vertical takeoff and landing aircraft with a rotor, and including a drive motor that turns the rotor. The control device controls the drive motor to operate selectively in any one operation mode of at least two operation modes: a normal mode and a functional test mode. In the normal mode, the control device controls the drive motor in accordance with a command from a body control device that controls the flight of the electric vertical takeoff and landing aircraft. In the functional test mode, the control device controls the drive motor in accordance with a command sent from outside according to a functional test program, or in accordance with the functional test program preset in the control device.

According to the control device for an electric vertical takeoff and landing aircraft in this aspect, the control device controls the electric drive system to operate selectively in any one of the at least two operation modes: the normal mode and the functional test mode. Thus, the electric drive system can be subjected to the functional test in a place for use of the electric vertical takeoff and landing aircraft.

The present disclosure may also be embodied in a variety of aspects. For example, the disclosure may be embodied in aspects such as an electric vertical takeoff and landing aircraft including a control device, and a control method for an electric vertical takeoff and landing aircraft.

A. First Embodiment

A-1. Device Configuration

Figure 1:
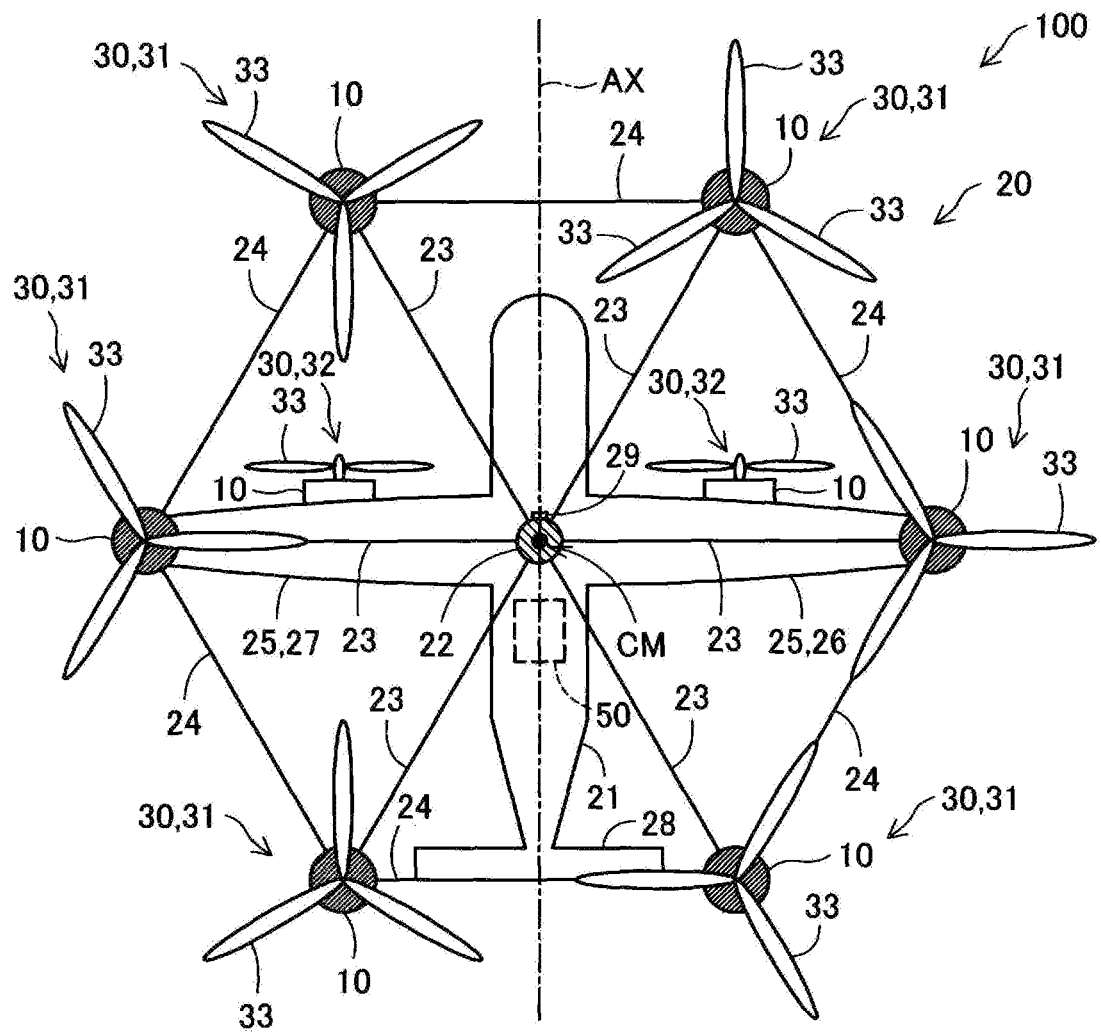
FIG. 1 is a schematic top view illustrating the structure of an electric vertical takeoff and landing aircraft incorporating a control device.
Figure 2:
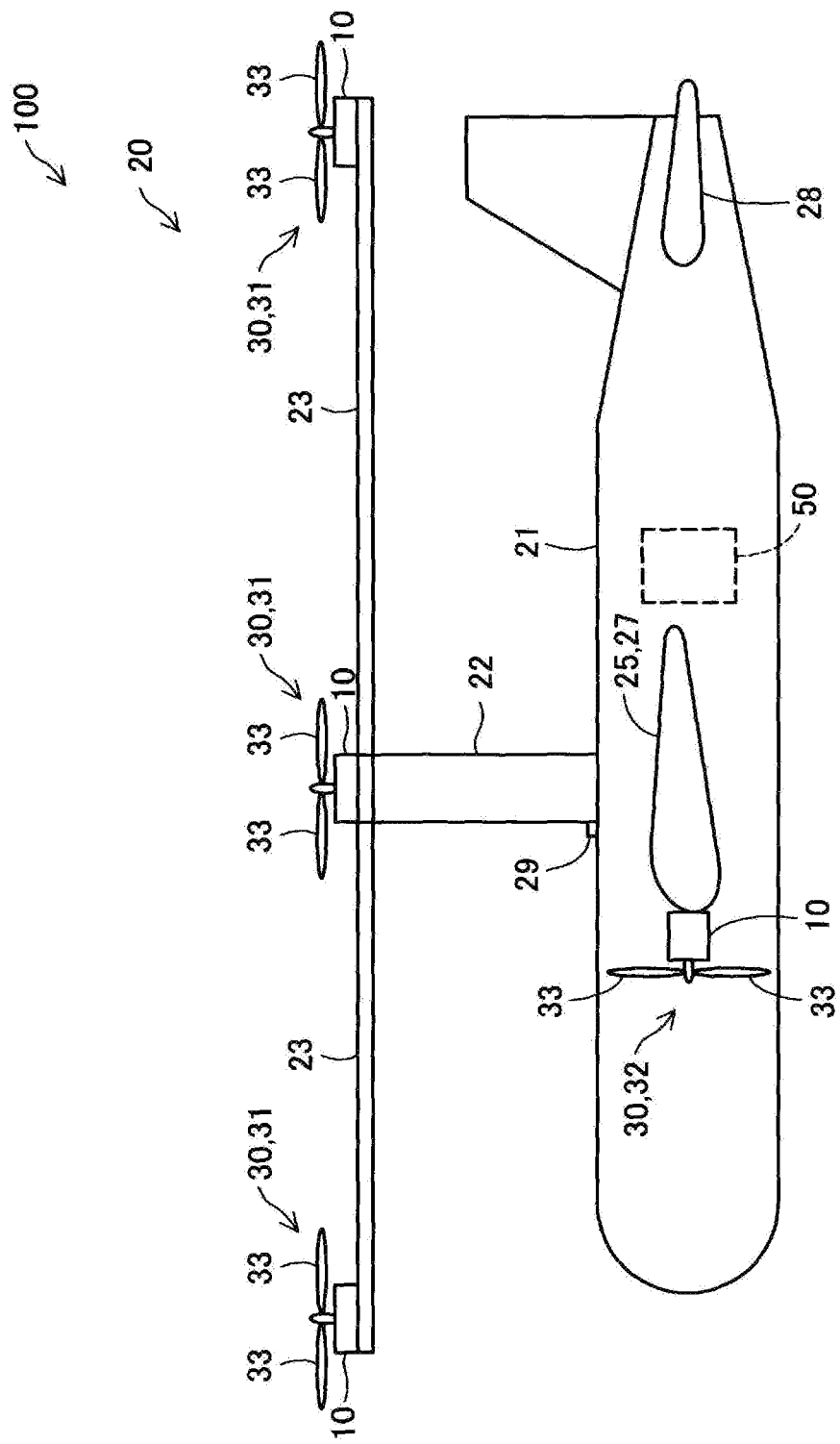
FIG. 2 is a schematic side view illustrating the structure of the electric vertical takeoff and landing aircraft.

As shown in FIGS. 1 and 2, an electric drive system 10 (hereinafter also referred to as the EDS 10) that uses a control device 19 according to an embodiment of the present disclosure is installed on an electric vertical takeoff and landing aircraft 100 (hereinafter also referred to as the eVTOL 100), and controls the operation of a rotor 30 included in the eVTOL 100.

Figure 3:
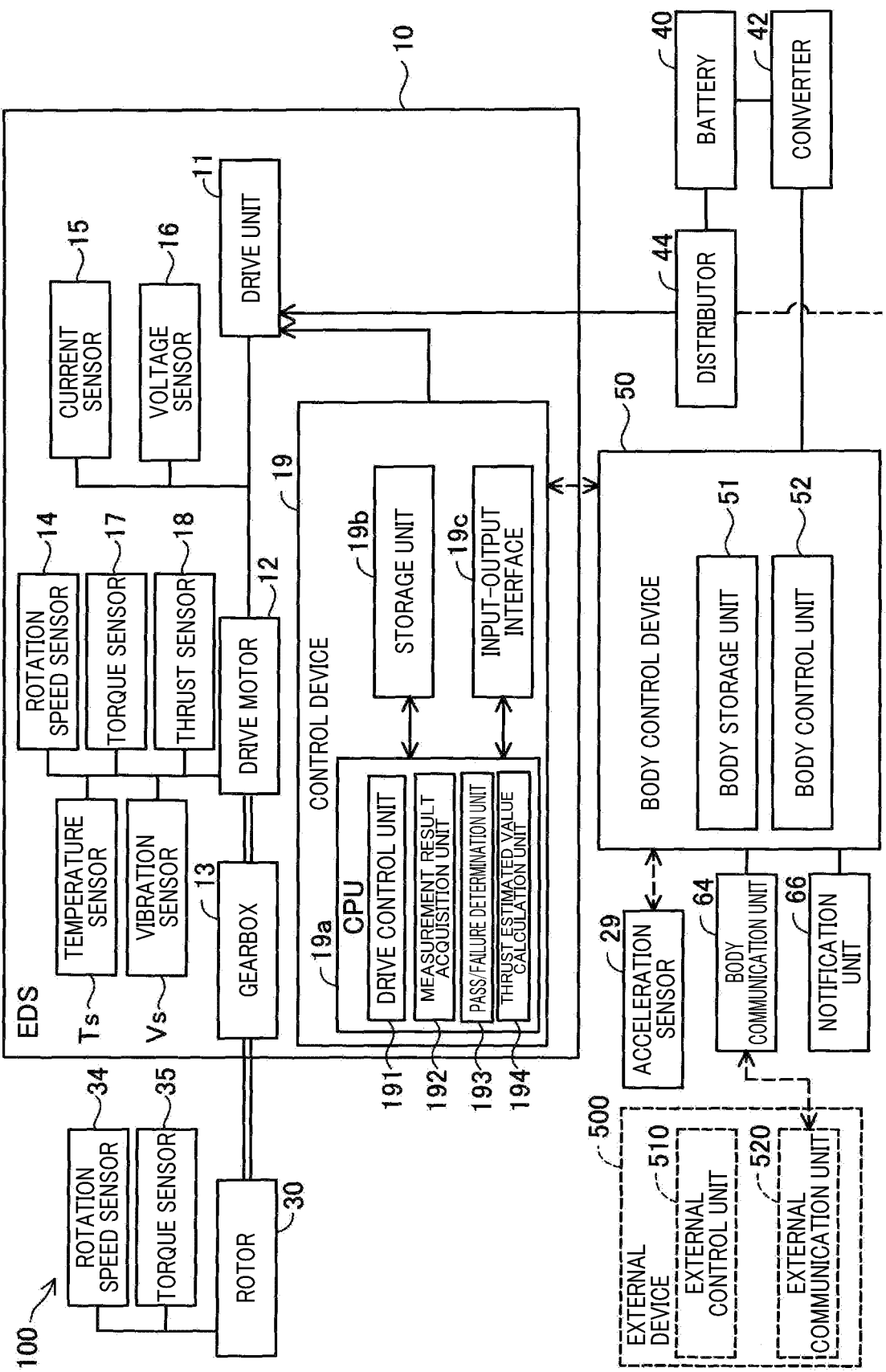
FIG. 3 is a block diagram illustrating the functional configuration of the electric vertical takeoff and landing aircraft.

The eVTOL 100 is driven by electricity and structured as a manned aircraft that can take off and land vertically. The eVTOL 100 includes, in addition to a plurality of EDSs 10, a body control device 50, a body 20, and a plurality of rotors 30 as well as a battery 40, a converter 42, a distributor 44, a body communication unit 64, and a notification unit 66 that are shown in FIG. 3.

The body control device 50 is configured as a computer including a body storage unit 51 and a central processing unit (CPU). The body storage unit 51 includes read only memory (ROM) and random access memory (RAM). The CPU executes the control programs prestored in the body storage unit 51 to function as a body control unit 52 that controls the overall operation of the eVTOL 100.

For example, the overall operation of the eVTOL 100 includes vertical takeoff and landing operations, flight operations, and a functional testing operation for each EDS 10. The vertical takeoff and landing operations and the flight operations may be performed based on set flight path information, by passenger piloting, or based on commands from an external control unit 510 included in an external device 500 described later. In the operation of the eVTOL 100, the body control unit 52 controls the rotation speed and the rotational direction of a drive motor 12 included in each EDS 10 and the blade angle of each rotor 30.

As shown in FIG. 1, the eVTOL 100 according to the present embodiment includes eight rotors 30 and eight EDSs 10. In FIG. 3, of the eight rotors 30 and the eight EDSs 10 included in the eVTOL 100, one rotor 30 and one EDS 10 are shown as representative components for convenience of illustration.

As shown in FIGS. 1 and 2, the body 20 corresponds to the eVTOL 100 from which the eight rotors 30 and the eight EDSs 10 are removed. The body 20 includes an aircraft main body 21, a prop 22, six first supports 23, six second supports 24, main wings 25, and a tail assembly 28.

The aircraft main body 21 forms the fuselage of the eVTOL 100. The aircraft main body 21 is bilaterally symmetrical about a body axis AX serving as the axis of symmetry. In the present embodiment, the term "body axis AX" refers to an axis passing through a body gravity center CM and extending in the front-and-rear direction of the eVTOL 100. The term "body gravity center CM" refers to the position of the gravity center of the eVTOL 100 in an empty weight condition without a passenger. The aircraft main body 21 has an internal passenger compartment (not shown). The aircraft main body 21 is also equipped with an acceleration sensor 29. The acceleration sensor 29 is used to control the posture of the eVTOL 100 in flight. The acceleration sensor 29 is a triaxial sensor and measures the acceleration of the eVTOL 100. The acceleration sensor 29 outputs its measurement results to the body control device 50.

The prop 22 has a substantially columnar outside shape extending in a vertical direction, and is secured on the top of the aircraft main body 21. In the present embodiment, the prop 22 is positioned at the body gravity center CM of the eVTOL 100 as viewed in a vertical direction. One end of each of the six first supports 23 is fixed to the upper end of the prop 22. The six first supports 23 each have a substantially rodlike outside shape, and are arranged radially at equal angles with respect to each other in a manner to extend along a plane orthogonal to a vertical direction. Each first support 23 has a rotor 30 and an EDS 10 placed on the other end, that is, the end positioned opposite the prop 22. The six second supports 24 each have a substantially rodlike outside shape and connect the other ends of adjacent first supports 23 (the ends not connected to the prop 22).

The main wings 25 include a right wing 26 and a left wing 27. The right wing 26 extends rightward from the aircraft main body 21. The left wing 27 extends leftward from the aircraft main body 21. The right wing 26 and the left wing 27 are each equipped with one rotor 30 and one EDS 10. The tail assembly 28 is formed at the rear end of the aircraft main body 21.

Six of the eight rotors 30 are arranged at the ends of the second supports 24 and serve as lifting rotors 31 intended mainly to produce the lift for the body 20. The other two of the eight rotors 30 are arranged on the right wing 26 and the left wing 27 on a one-to-one basis, and serve as cruising rotors 32 intended mainly to produce thrust for the body 20. The rotors 30 turn about their own rotation axes independently of each other. Each rotor 30 includes three blades 33 arranged at equal angles with respect to each other. In the present embodiment, each rotor 30 has a variable blade angle. Specifically, the blade angle is adjusted by an actuator (not shown) in accordance with an instruction from the body control device 50. As shown in FIG. 3, each rotor 30 is provided with a rotation speed sensor 34 and a torque sensor 35. The rotation speed sensor 34 measures the rotation speed of the rotor 30. The torque sensor 35 measures the rotational torque of the rotor 30. The sensors 34 and 35 output their measurement results to the body control device 50.

The eight EDSs 10 shown in FIG. 1 are configured as electric drive systems intended to turn the corresponding rotors 30. Six of the eight EDSs 10 turn the corresponding lifting rotors 31. The other two of the eight EDSs 10 turn the corresponding cruising rotors 32.

As shown in FIG. 3, each EDS 10 includes a drive unit 11, a drive motor 12, a gearbox 13, a rotation speed sensor 14, a current sensor 15, a voltage sensor 16, a torque sensor 17, a thrust sensor 18, a temperature sensor Ts, a vibration sensor Vs, and a control device 19.

The drive unit 11 includes an inverter circuit (not shown) and turns the drive motor 12. The inverter circuit is a power device such as an insulated gate bipolar transistor (IGBT) or a metal-oxide-semiconductor field-effect transistor (MOSFET), and feeds a driving voltage to the drive motor 12 at a duty ratio according to a control signal received from the control device 19.

The drive motor 12 in the present embodiment is a brushless motor and outputs the rotational motion corresponding to the voltage and the current fed from the inverter circuit in the drive unit 11. It is noted that the brushless motor may be replaced with any motor such as an induction motor or a reluctance motor.

The gearbox 13 physically connects the drive motor 12 and the rotor 30. The gearbox 13 includes multiple gears (not shown), and decelerates and transmits the rotation of the drive motor 12 to the rotor 30. It is noted that the gearbox 13 may be omitted, and the drive motor 12 may be connected directly with the rotational shaft of the rotor 30.

The rotation speed sensor 14, the torque sensor 17, the thrust sensor 18, the temperature sensor Ts, and the vibration sensor Vs are installed on the drive motor 12 and measure the rotation speed, the rotational torque, the thrust, the temperature, and the vibration of the drive motor 12, respectively. The rotation speed sensor 14 corresponds to a rotation speed measurement unit, whereas the thrust sensor 18 corresponds to a thrust measurement unit. The thrust sensor 18 includes, for example, a spring and a strain gage for sensing the strain that is the elongation of the spring, and uses the sensed strain to measure the thrust. The current sensor 15 and the voltage sensor 16 are installed between the drive unit 11 and the drive motor 12, and measure the driving current and the driving voltage, respectively. The sensors 14 to 18, Ts, and Vs output their measurement results to the control device 19, and the control device 19 also outputs them to the body control device 50.

The control device 19 controls the overall electric drive system 10. In the present embodiment, the control device 19 controls the EDS 10 to operate selectively in any one operation mode of a normal mode and a functional test mode. The normal mode is an operation mode for controlling the turning of the rotor 30 by driving the drive motor 12 in accordance with command values received from the body control device 50 to fly the eVTOL 100 in accordance with the passenger S driving operations or preset flight programs. The functional test mode is an operation mode for verifying the normality of the EDS 10, or in other words, performing a test for determining whether the functions of the EDS 10 work normally (hereinafter also referred to as the functional test). In the present embodiment, the drive motor 12 is, also in the functional test mode, driven in accordance with command values received from the body control device 50. The functional test will be described in detail later.

The control device 19 is configured as a computer including a CPU 19a, a storage unit 19b, and an input-output interface 19c. The CPU 19a executes the control programs prestored in the storage unit 19b to function as a drive control unit 191, a measurement result acquisition unit 192, a pass/failure determination unit 193, and a thrust estimated value calculation unit 194.

The drive control unit 191 sends the control signal corresponding to the command values received from the body control device 50 to the drive unit 11 to drive the rotor 30. The command values correspond to, for example, a target rotation speed and a target thrust value for the drive motor 12.

The measurement result acquisition unit 192 acquires at least one measurement result of the rotation speed, the driving current, the driving voltage, and the thrust of the drive motor 12. Specifically, the measurement result acquisition unit 192 acquires at least one of the measurement results from the rotation speed sensor 14, the current sensor 15, the voltage sensor 16, and the thrust sensor 18. The measurement result acquisition unit 192 may acquire measurement results not only from the sensors installed in the EDS 10, but also from, for example, the rotation speed sensor 34 provided for the rotor 30.

The pass/failure determination unit 193 uses the measurement result acquired in the measurement result acquisition unit 192 to determine pass or fail of the functional test. Specifically, for example, a thrust estimated value that is an estimated value of the thrust in the functional test mode and the thrust measurement result acquired in the measurement result acquisition unit 192 are used to determine whether the difference between the thrust estimated value and the thrust measurement result falls within a predetermined range. If the difference is within the predetermined range, the pass/failure determination unit 193 determines that the functional test is passed. If the difference is out of the range, the pass/failure determination unit 193 determines that the functional test is failed. This will now be described in detail with reference to FIGS. 4 to 10.

Figure 4:
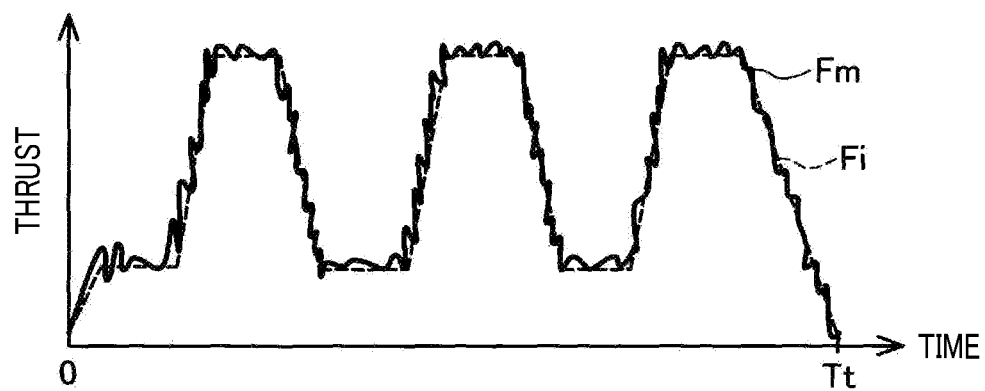
FIG. 4 is a graph showing an example of functional test results.

FIG. 4 shows estimated values and measurement values of thrust. In FIG. 4, the horizontal axis represents time, and the vertical axis represents the thrust produced by the rotor 30. The dashed line Fi represents the thrust estimated values, and the bold solid line Fm represents the thrust measurement values. The thrust estimated values are calculated by, for example, the drive control unit 191 that has received a command of the output rotation speed of the drive motor 12 from the body control device 50. The drive control unit 191 calculates a thrust estimated value per unit time and determines the difference between the calculated thrust estimated value and the thrust measurement value obtained by the thrust sensor 18. If the absolute value of the determined difference is smaller than a predetermined threshold for the whole test period Tt, the pass/failure determination unit 193 determines that the functional test is passed. If the absolute value is equal to or greater than the threshold, the pass/failure determination unit 193 determines that the functional test is failed.

Figure 5:
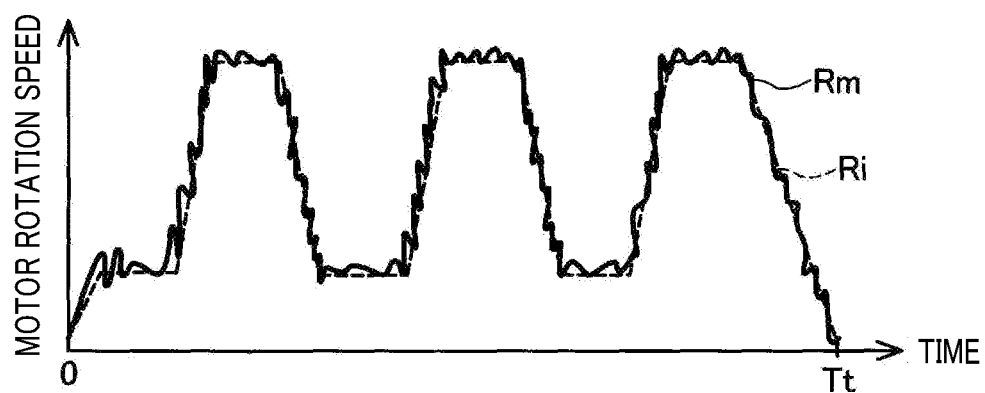
FIG. 5 is a graph showing an example of functional test results.

FIG. 5 shows command values and measurement values of the rotation speed of the drive motor 12. In FIG. 5, the horizontal axis represents time, and the vertical axis represents the motor rotation speed. The dashed line Ri represents the rotation speed command values, and the bold solid line Rm represents the rotation speed measurement values. The rotation speed command values are based on the rotation speed of the drive motor 12 issued from the body control device 50 to the control device 19. The rotation speed measurement values are measurement values of the rotation speed obtained by the rotation speed sensor 14. The pass/failure determination unit 193 determines the pass or fail of the functional test based on the rotation speed of the drive motor 12 (the rotation speed of the rotor 30) in the same manner as described above for the thrust.

Figure 6:
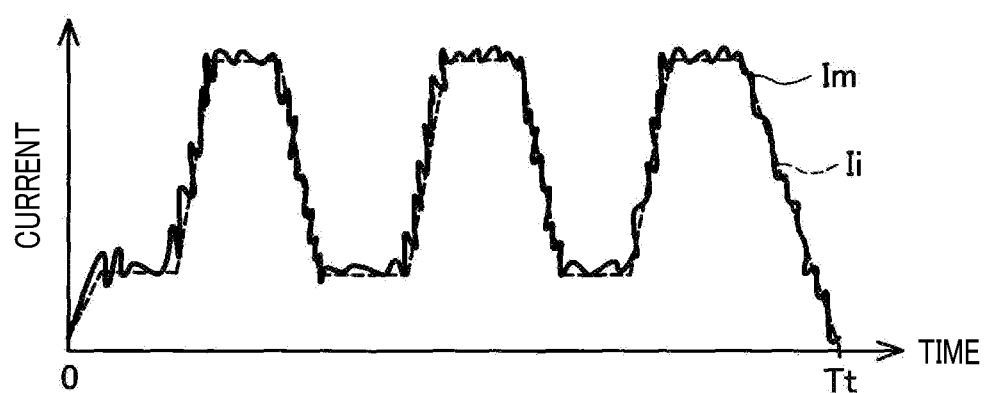
FIG. 6 is a graph showing an example of functional test results.

FIG. 6 shows command values and measurement values of currents. In FIG. 6, the horizontal axis represents time, and the vertical axis represents currents. The dashed line Ii represents the current command values, and the bold solid line Im represents the current measurement values. The current command values are based on the rotation speed of the drive motor 12 issued from the body control device 50 to the control device 19. The current measurement values are measurement values of the current obtained by the current sensor 15. The pass/failure determination unit 193 determines the pass or fail of the functional test based on the current values in the same manner as described above for the thrust.

Figure 7:
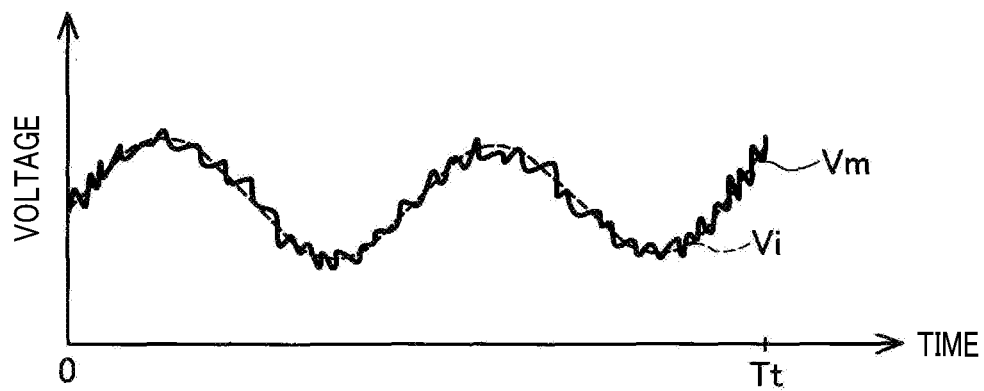
FIG. 7 is a graph showing an example of functional test results.

FIG. 7 shows command values and measurement values of voltages. In FIG. 7, the horizontal axis represents time, and the vertical axis represents voltages. The dashed line Vi represents the voltage command values, and the bold solid line Vm represents the voltage measurement values. The voltage command values are based on the rotation speed of the drive motor 12 issued from the body control device 50 to the control device 19. The voltage measurement values are measurement values of the voltage obtained by the voltage sensor 16. The pass/failure determination unit 193 determines the pass or fail of the functional test based on the voltage values in the same manner as described above for the thrust.

Figure 8:
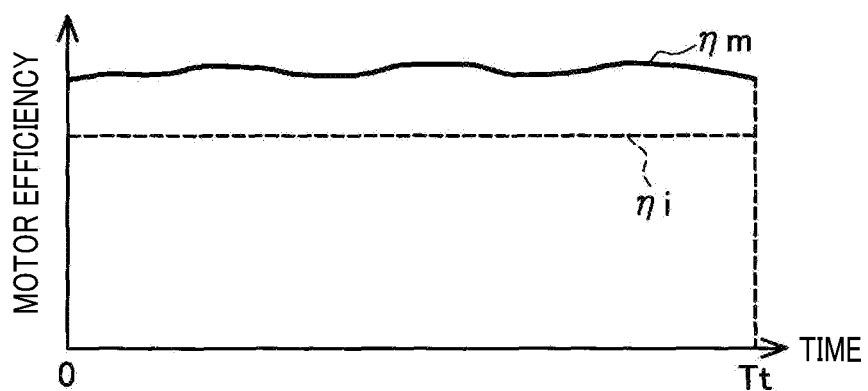
FIG. 8 is a graph showing an example of functional test results.

FIG. 8 shows motor efficiency measurement values. In FIG. 8, the horizontal axis represents time, and the vertical axis represents motor efficiency. The dashed line $\eta i$ represents a predetermined threshold, and the bold solid line $\eta m$ represents the measurement values. The motor efficiency means the amount of work of the drive motor 12 for input power. The amount of work of the drive motor 12 is calculated based on the rotation speed of the drive motor 12 measured by the rotation speed sensor 14 and the torque of the drive motor 12 measured by the torque sensor 17. If the measurement value is equal to or greater than the predetermined threshold for the whole test period Tt, the pass/failure determination unit 193 determines that the functional test is passed. If the measurement value is smaller than the threshold, the pass/failure determination unit 193 determines that the functional test is failed. The threshold is set after being determined beforehand by, for example, experiment.

Figure 9:
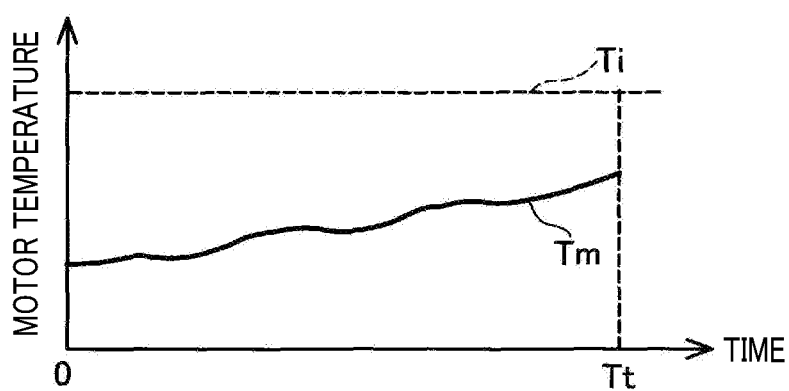
FIG. 9 is a graph showing an example of functional test results.

FIG. 9 shows motor temperature measurement values. In FIG. 9, the horizontal axis represents time, and the vertical axis represents motor temperatures. The dashed line Ti represents a predetermined threshold, and the bold solid line Tm represents the measurement values. The motor temperatures are measurement values obtained by the temperature sensor Ts. If the measurement value is smaller than the predetermined threshold for the whole test period Tt, the pass/failure determination unit 193 determines that the functional test is passed. If the measurement value is equal to or greater than the threshold, the pass/failure determination unit 193 determines that the functional test is failed. The threshold is set after being determined beforehand by, for example, experiment.

Figure 10:
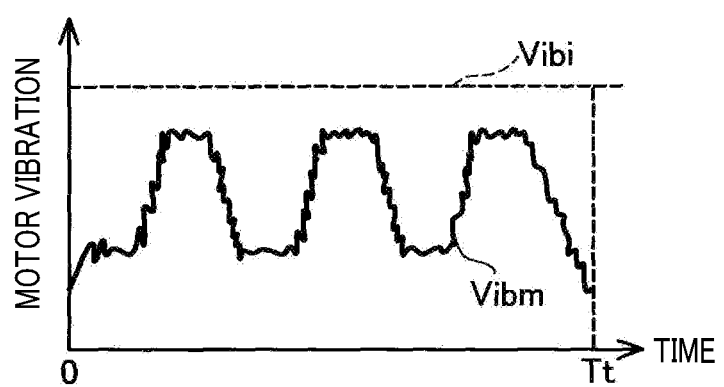
FIG. 10 is a graph showing an example of functional test results.

FIG. 10 shows motor vibration measurement values. In FIG. 10, the horizontal axis represents time, and the vertical axis represents motor vibrations. The dashed line Vibi represents a predetermined threshold, and the bold solid line Vibm represents the measurement values. The motor vibrations are the measurement values obtained by the vibration sensor Vs. If the measurement values are smaller than the predetermined threshold for the whole test period Tt, the pass/failure determination unit 193 determines that the functional test is passed. If the measurement values are equal to or greater than the threshold, the pass/failure determination unit 193 determines that the functional test is failed. The threshold is set after being determined beforehand by, for example, experiment.

As shown in FIG. 3, the thrust estimated value calculation unit 194 calculates the thrust estimated value based on atmospheric density, a command value of the rotation speed to the drive motor 12, and the installation angle of the rotor 30. It is noted that the thrust estimated value may be input from outside. For example, the body control device 50 may receive a thrust estimated value through a user interface (not shown), and input the received value to the control device 19 through the input-output interface 19c.

The storage unit 19b includes ROM and RAM, and the above control programs are prestored in the ROM. The ROM also stores measurement values from each sensor.

The input-output interface 19c is used to communicate estimated values and output values between the control device 19 and outside. For example, the input-output interface 19c receives a thrust estimated value from outside. The input-output interface 19c also receives a command value (such as a command value concerning the rotation speed of the drive motor 12) from the body control device 50. The input-output interface 19c also serves as a transmission interface that transmits, to outside, at least one of a command value to the drive motor 12, the measurement results acquired by the measurement result acquisition unit 192, and the pass/failure result from the pass/failure determination unit 193.

The battery 40 includes lithium ion cells and functions as a power source for the eVTOL 100. The battery 40 mainly feeds electricity to the drive unit 11 included in each EDS 10 to drive the corresponding drive motor 12. The lithium ion cells may be replaced with any secondary cells such as nickel metal hydride cells. In place of the battery 40 or in addition to the battery 40, any power source such as a fuel cell or an electric generator may be installed.

The converter 42 is connected to the battery 40, and steps down and feeds the voltage of the battery 40 to the body control device 50 and the auxiliary equipment (not shown) included in the eVTOL 100. The distributor 44 distributes the voltage of the battery 40 to the drive unit 11 included in each EDS 10.

The functional test for each EDS 10 is performed after an inspection of the EDS 10 such as a periodical inspection or an inspection in the event of a malfunction, or maintenance such as a replacement of a component in the EDS 10. The test is intended to simply check the operation of the EDS 10 subjected to the inspection or the maintenance. In the present embodiment, the EDS 10 subjected to the functional test is referred to as the system under test. The functional test confirms that the system under test operates normally, and the rotor 30 turned by the system under test (hereinafter also referred to as the rotor tested) rotates normally. Specifically, in the functional test, as shown in FIGS. 6 and 7, the drive motor 12 is fed with voltage and current on a predetermined test pattern, and the resultant voltage value, current value, motor rotation speed, rotor rotation speed, temperature, and thrust are measured. The differences between the target values and the actual measurements are used to determine the normality of the system under test and the rotor tested.

The body communication unit 64 has the function of wireless communications, which allows transmission and reception of information between the eVTOL 100 and an external communication unit 520 included in the external device 500, and also communication with the body control device 50. Examples of wireless communications include civilian VHF (Very High Frequency) wireless communications, wireless communications provided by telecommunications carriers such as 4G (fourth generation wireless system) or 5G (fifth generation wireless system) wireless communications, and wireless LAN communications according to the IEEE 802.11 standard. Other examples include wired communications according to the USB (Universal Serial Bus) standard or the IEEE 802.3 standard. The external device 500 corresponds to, for example, a computer for management and control such as a server device that controls the functional test and records the test results. For example, the computer for management and control may be a server device placed in an air traffic control room or a personal computer brought to a place for use of the eVTOL 100 by a maintenance worker who performs maintenance and inspection including the functional test.

The notification unit 66 provides notification in accordance with an instruction from the body control device 50. In the present embodiment, the notification unit 66 includes a display device that is installed in the passenger compartment and displays characters and images and a speaker that outputs voice and a warning sound, and informs the passenger of various types of information through visual information and audio information.

A-2. Procedure of Functional Test

Figure 11:
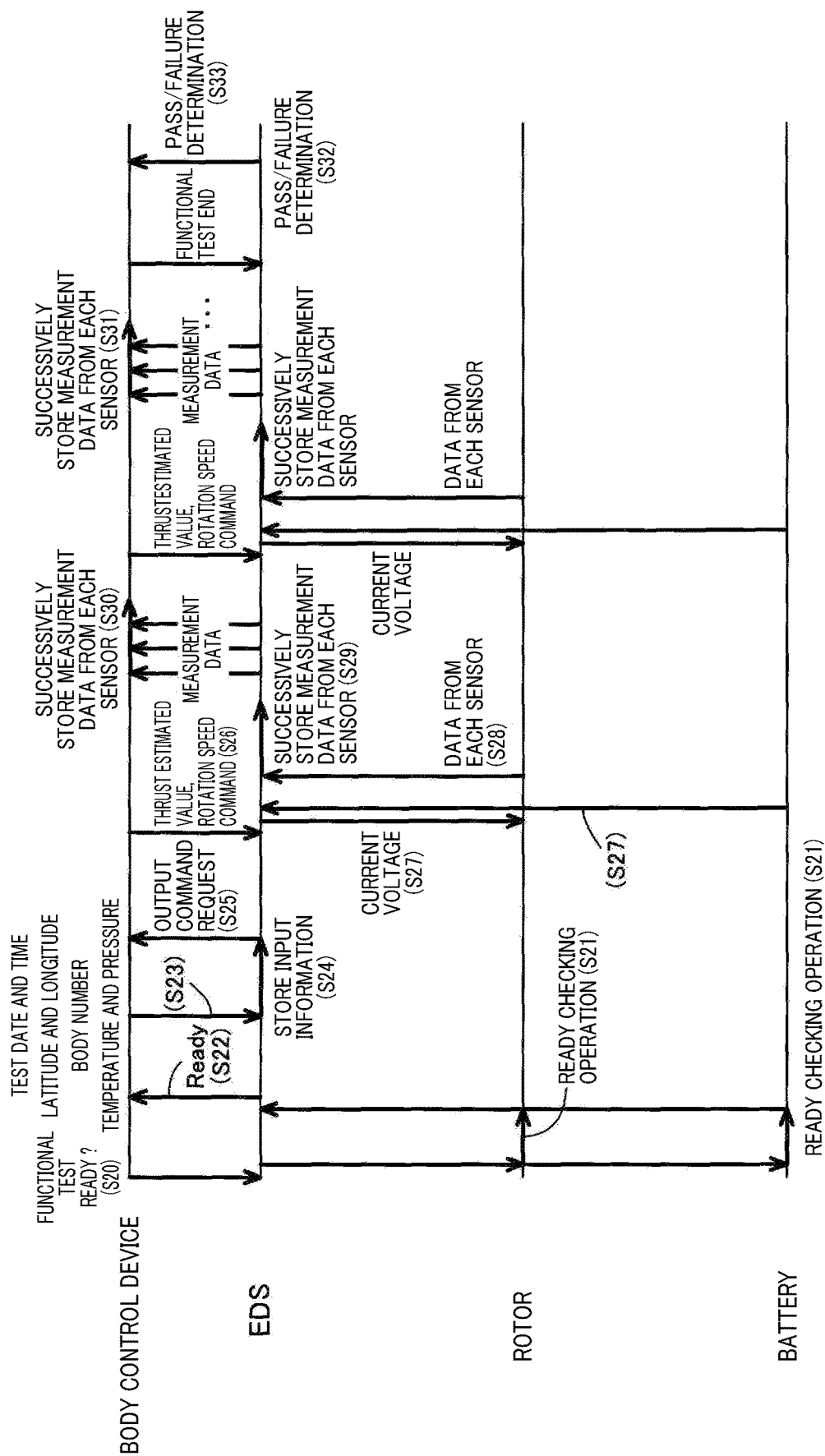
FIG. 11 is a sequence diagram showing the procedure of a functional test.

The functional test sequence shown in FIG. 11 is started by a worker inputting an instruction to perform the functional test through the user interface (not shown) connected to the body control device 50. In the body control device 50, the body control unit 52 sends a test start signal to the EDS 10 that is the system under test (step S20). In response to the signal, the control device 19 in the EDS 10 checks whether the rotor 30 and the battery 40 are in a state in which the test can start (Ready) (step S21). For example, the rotor 30 is temporarily powered, and it is determined whether the rotor 30 can rotate. For the battery 40, the state of charge (SOC) of the battery 40 is checked. When the rotor 30 and the battery 40 are Ready, the control device 19 sets the operation mode of the EDS 10 to the functional test mode, and notifies the body control device 50 of being Ready (step S22).

The body control device 50 notified of being Ready sends input information including the test date and time, the latitude and longitude, the body number, and the temperature and pressure to the EDS 10 (step S23). The control device 19 in the EDS 10 stores the received input information into the storage unit 19b (step S24). The information stored in step S24 will be associated with the pass/failure determination result of the functional test obtained later. The control device 19 in the EDS 10 sends an output command request to the body control device 50 (step S25). The body control device 50 sends a thrust estimated value and a command value of the rotation speed to the EDS 10 (step S26). The control device 19 in the EDS 10 that has received the command test-drives the drive motor 12 in accordance with the command (step S27). In the present embodiment, the command sent from the body control device 50 is issued in accordance with a functional test program in the body control device 50. In accordance with such a command, the drive control unit 191 controls the drive unit 11 to feed a current value and a voltage value on the predetermined test pattern to the drive motor 12, and as a result, electricity is fed from the battery 40.

The rotation speed sensor 34 and the torque sensor 35 send the data measured during the functional test being performed to the EDS 10 (step S28). In the EDS 10, the measurement result acquisition unit 192 successively stores the measurement data obtained by each sensor into the storage unit 19b (step S29). The measurement data obtained by each sensor is sent from the EDS 10 to the body control device 50, and the body control device 50 successively stores the data into the body storage unit 51 (step S30). Steps S26 to S30 above are repeated at different frequencies that vary the driving voltage.

The body control device 50 sends a functional test end signal to the EDS 10 (step S31). In the control device 19, the pass/failure determination unit 193 determines the pass or fail (step S32) and sends the pass/failure determination result to the body control device 50 (step S33).

The control device 19 in the first embodiment described above allows the functional test to be performed in a place other than an examination site because the control device 19 controls the EDS 10 to operate selectively in any one of the at least two operation modes: the normal mode and the functional test mode. Thus, the system under test can be subjected to the functional test in a place for use of the electric vertical takeoff and landing aircraft.

The control device 19 in the first embodiment includes the measurement result acquisition unit 192 that acquires the at least one measurement result of the rotation speed, the driving current, the driving voltage, and the thrust of the drive motor 12, and the pass/failure determination unit 193 that uses the acquired measurement result to determine the pass or fail of the functional test. Thus, the control device 19 in the EDS 10 can acquire the measurement result and use the acquired measurement result to determine the pass or fail of the functional test.

The EDS 10 in the first embodiment includes the rotation speed sensor 14 corresponding to the rotation speed measurement unit that measures the rotation speed. The measurement result acquisition unit 192 acquires the measurement result of the rotation speed from the rotation speed sensor 14. Thus, the functional test determination of the pass/failure may use the measurement result of the rotation speed of the drive motor 12.

The EDS 10 in the first embodiment further includes the thrust sensor 18 corresponding to the thrust measurement unit that measures the thrust. The measurement result acquisition unit 192 acquires the measurement result of thrust from the thrust sensor 18, and the pass/failure determination unit 193 uses the thrust estimated value that is the estimated value of thrust in the functional test mode and the acquired thrust measurement result to determine the pass or fail of the functional test. This improves the accuracy of the pass/failure determination in the functional test.

The control device 19 in the first embodiment further includes the thrust estimated value calculation unit 194 that calculates the thrust estimated value based on atmospheric density, a command value of the rotation speed to the drive motor 12, and the installation angle of the rotor 30. This improves the accuracy of the pass/failure determination in the functional test further.

The control device 19 in the first embodiment further includes the input-output interface 19c corresponding to an input interface that allows receipt of a thrust estimated value from outside. Thus, the control device 19 may have a simple configuration.

The control device 19 in the first embodiment further includes the storage unit 19b that stores at least one of a command value to the drive motor 12, the acquired measurement results, and the pass/failure result of the functional test. Thus, for example, for use in pass/failure determination or output to outside, command values and results can be stored in the storage unit 19b.

The control device 19 in the first embodiment further includes the input-output interface 19c that allows at least one of a command value to the drive motor 12, the acquired measurement results, and the pass/failure result of the functional test to be sent to outside through the input-output interface 19c corresponding to the transmission interface included in the EDS 10. Thus, at least one of the command value, the measurement results, and the pass/failure result of the functional test can be sent to, for example, the body control device 50 through the input-output interface 19c.

B. Second Embodiment

Figure 12:
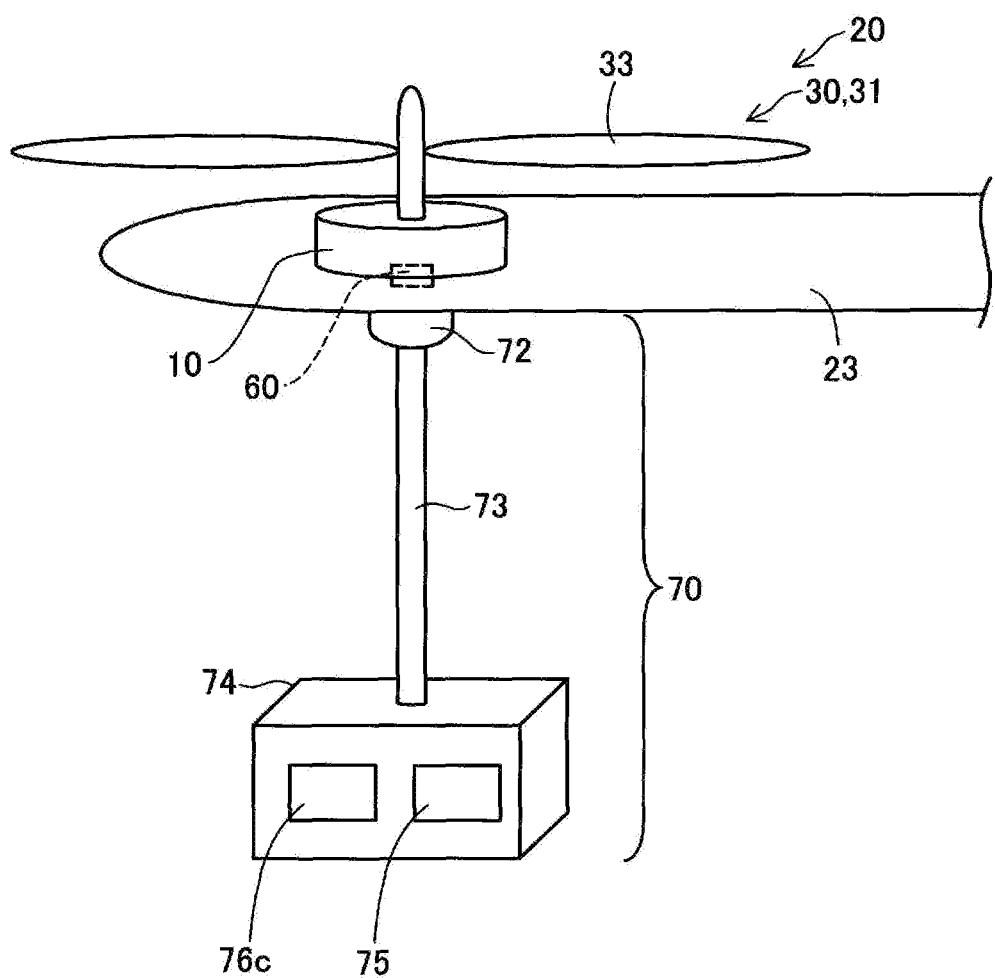
FIG. 12 is a schematic perspective view illustrating a system under test to which a harness is attached.

An eVTOL 100 according to a second embodiment is different in configuration from the eVTOL 100 according to the first embodiment in that the EDS 10 includes a connection unit 60 as shown in FIG. 12, the electric drive system 10 does not include the thrust sensor 18, and a harness 70 is attached to the body 20 as shown in FIG. 12 during the test procedure described later and including a functional test. The other components in the eVTOL 100 according to the second embodiment are the same as in the eVTOL 100 according to the first embodiment, and thus a detailed description thereof will be omitted by using the same reference numerals to denote the same components.

The connection unit 60 is used to mechanically connect the EDS 10 to the body 20. When the functional test is performed, as shown in FIG. 12, the body 20 (the first support 23) is connected with the harness 70. Thus, the connection unit 60 is a mechanical connection unit for connecting indirectly via the body 20 to the harness 70 capable of holding the EDS 10 in the direction of thrust generated. The connection unit 60 and the harness 70 may be connected directly. More specifically, with the EDS 10 exposed from the first support 23, the EDS 10 may be connected to the harness 70 via the connection unit 60. In this structure, the connection unit 60 connects the EDS 10 directly to the harness 70.

The harness 70 is fixed on the ground at a given site. The harness 70, in the functional test, measures and successively sends the thrust of the drive motor 12 to the control device 19. The harness 70 includes a harness connection unit 72, a thrust related value sensor unit 73, and a main body unit 74.

The harness connection unit 72 is positioned at the upper end of the harness 70. The lower end of the harness connection unit 72 is connected to the thrust related value sensor unit 73 described later. The harness connection unit 72 serves to connect indirectly to the EDS 10 via the body 20 of the eVTOL 100. More specifically, the harness connection unit 72 connects to the EDS 10 via the first support 23.

The thrust related value sensor unit 73 extends, as shown in FIG. 12, from the lower end of the harness connection unit 72 to the upper end of the main body unit 74. The thrust related value sensor unit 73 has a columnar outside shape. In the present embodiment, the thrust related value sensor unit 73 connects the harness connection unit 72 and the main body unit 74, and incorporates a thrust sensor that measures the thrust of the EDS 10 that is the system under test. The thrust sensor includes, for example, a spring and a strain gage for sensing the strain that is the elongation of the spring, and uses the sensed strain to measure the thrust. The installation of the thrust related value sensor unit 73 in the harness 70 enables pass/failure determination of the functional test of thrust even for the configuration of the EDS 10 in the present embodiment that includes no thrust sensor.

The main body unit 74 includes a harness interface unit 75 and a harness acquisition unit 76c. The harness interface unit 75 outputs, to outside, an output value from the thrust related value sensor unit 73 acquired by the harness acquisition unit 76c described below. The harness acquisition unit 76c acquires a command value to the EDS 10 and an output value from the thrust related value sensor unit 73. In the present embodiment, the harness acquisition unit 76c can acquire thrust directly from the thrust related value sensor unit 73.

Figure 13:
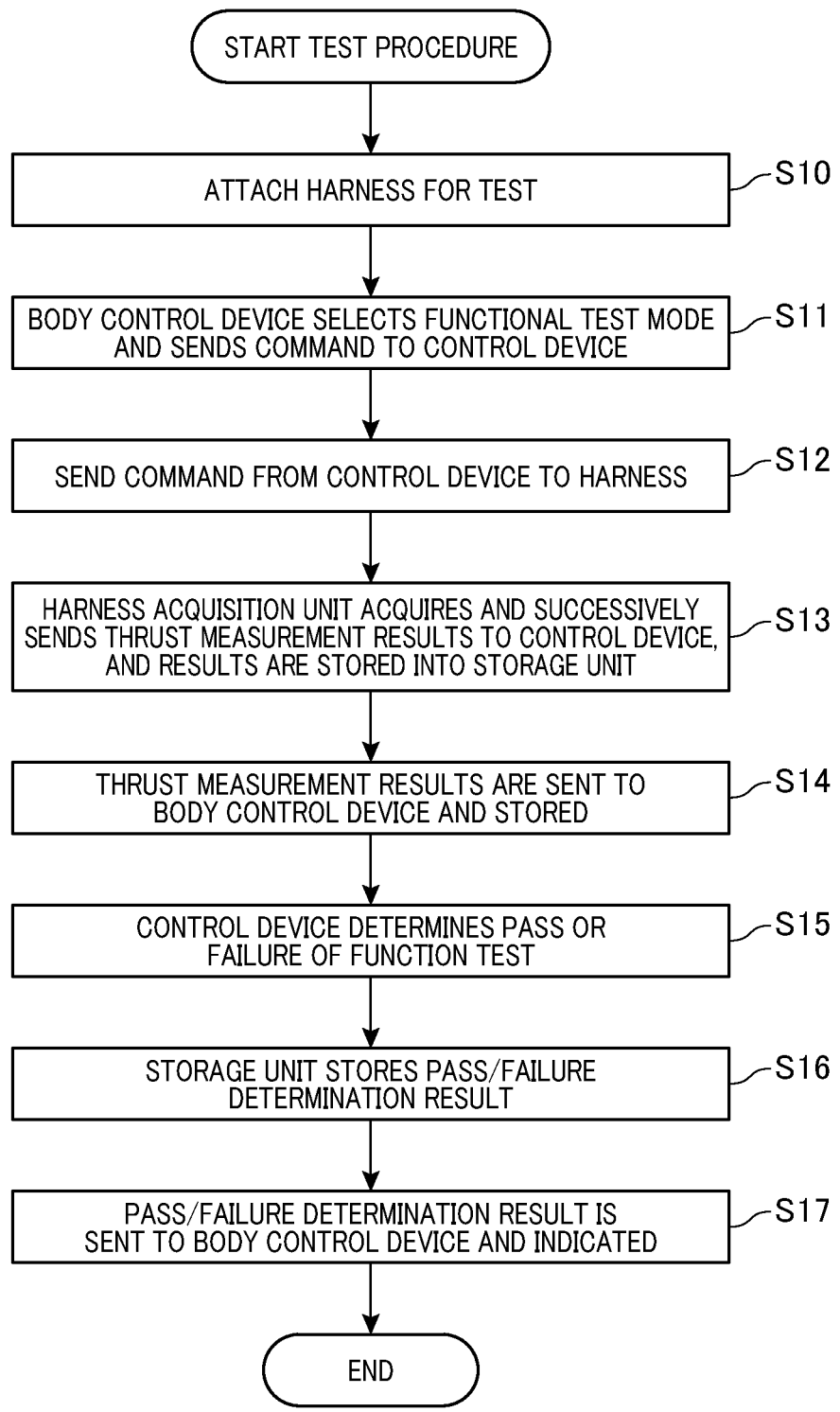
FIG. 13 is a flowchart showing a testing procedure in a second embodiment.

FIG. 13 shows a test procedure that refers to a process for performing a functional test on the EDS 10. The functional test on the EDS 10 is performed with the harness 70 installed to the system under test. In the test procedure, the harness 70 for the test is first attached to the EDS 10 via the first support 23 (step S10).

The body control unit 52 in the body control device 50 selects the functional test mode and sends a command to the control device 19 (step S11). The processing in step S11 corresponds to steps S20 to S22 in FIG. 11. The control device 19 sends the command to the harness 70 through the input-output interface 19c (step S12). In the harness 70 that has received the command, the harness acquisition unit 76c acquires thrust measurement results from the thrust sensor incorporated in the thrust related value sensor unit 73 and successively sends the results to the control device 19 through the harness interface unit 75, and the results are stored into the storage unit 19b (step S13). The thrust measurement results are successively sent from the control device 19 to the body control device 50 and stored into the body storage unit 51 (step S14). The processing in step S13 corresponds to steps S28 to S29 in FIG. 11, and the processing in step S14 corresponds to step S30 in FIG. 11.

The pass/failure determination unit 193 of the control device 19 determines the pass or fail of the functional test (step S15). The processing in step S15 corresponds to step S32 in FIG. 11. The storage unit 19b stores the pass/failure determination result (step S16). The pass/failure determination result is sent from the control device 19 to the body control device 50 and indicated on the display (not shown) of the body control device 50 (step S17).

The control device 19 according to the second embodiment described above achieves the same effects as the control device 19 according to the first embodiment does. In addition, the EDS 10 includes the connection unit 60 for connecting to the harness 70 directly or indirectly via the body 20 of the eVTOL 100. Thus, even when the rotor 30 is turning in the functional test, the EDS 10 will not rise, rotate, or otherwise change in position greatly. This enables various parameters such as the rotation speed and the vibration to be measured with high accuracy in the functional test.

The EDS 10 includes, in place of the thrust sensor, the input interface that allows receipt of measurement results from the thrust measurement device, and the measurement result acquisition unit 192 acquires the thrust measurement results received through the input interface. Thus, the EDS 10 may have a simple configuration.

Furthermore, since the control device 19 can receive measurement results from the thrust measurement device that is placed in the harness 70 and measures the thrust of the rotor 30 (the drive motor 12), the thrust is measurable even for the configuration of the EDS 10 that includes no thrust measurement device.

C. Third Embodiment

A-1. Device Configuration

Figure 14:
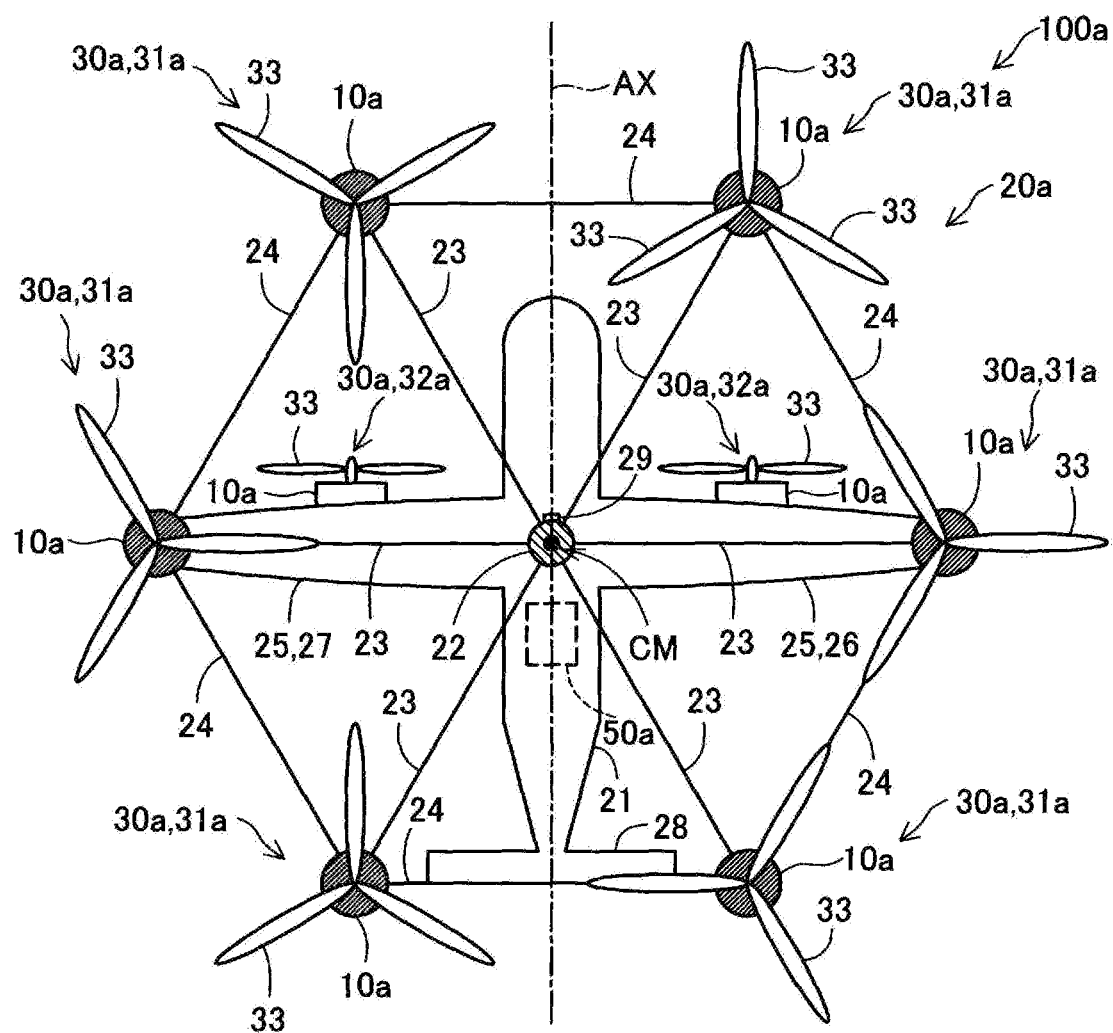
FIG. 14 is a schematic top view illustrating the structure of an electric vertical takeoff and landing aircraft incorporating a control device.
Figure 15:
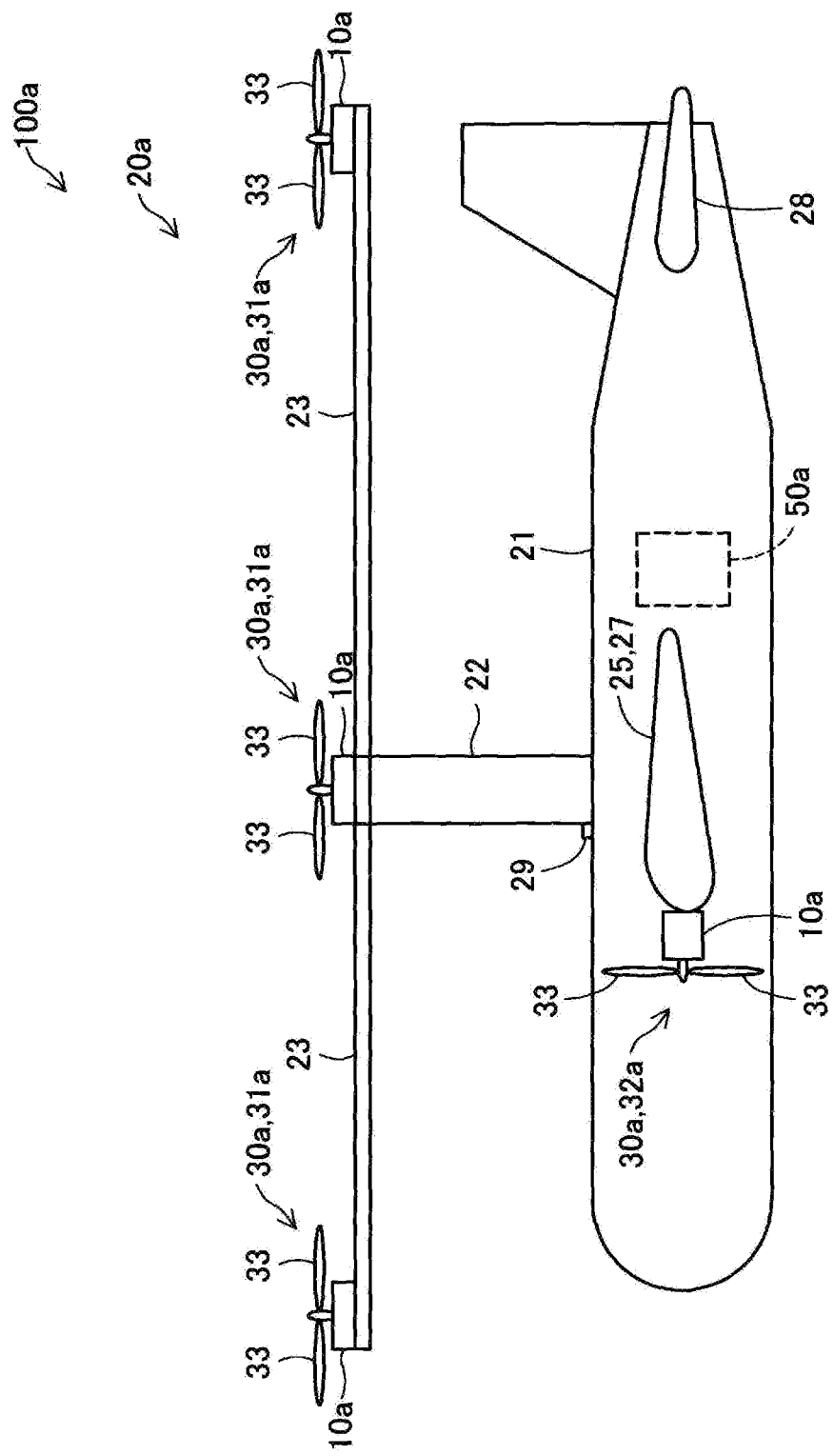
FIG. 15 is a schematic side view illustrating the structure of the electric vertical takeoff and landing aircraft.

As shown in FIGS. 14 and 15, a control device 50a according to an embodiment of the present disclosure is installed in an electric vertical takeoff and landing aircraft 100a (hereinafter also referred to as the eVTOL 100a), and controls the operation of the eVTOL 100a.

Figure 16:
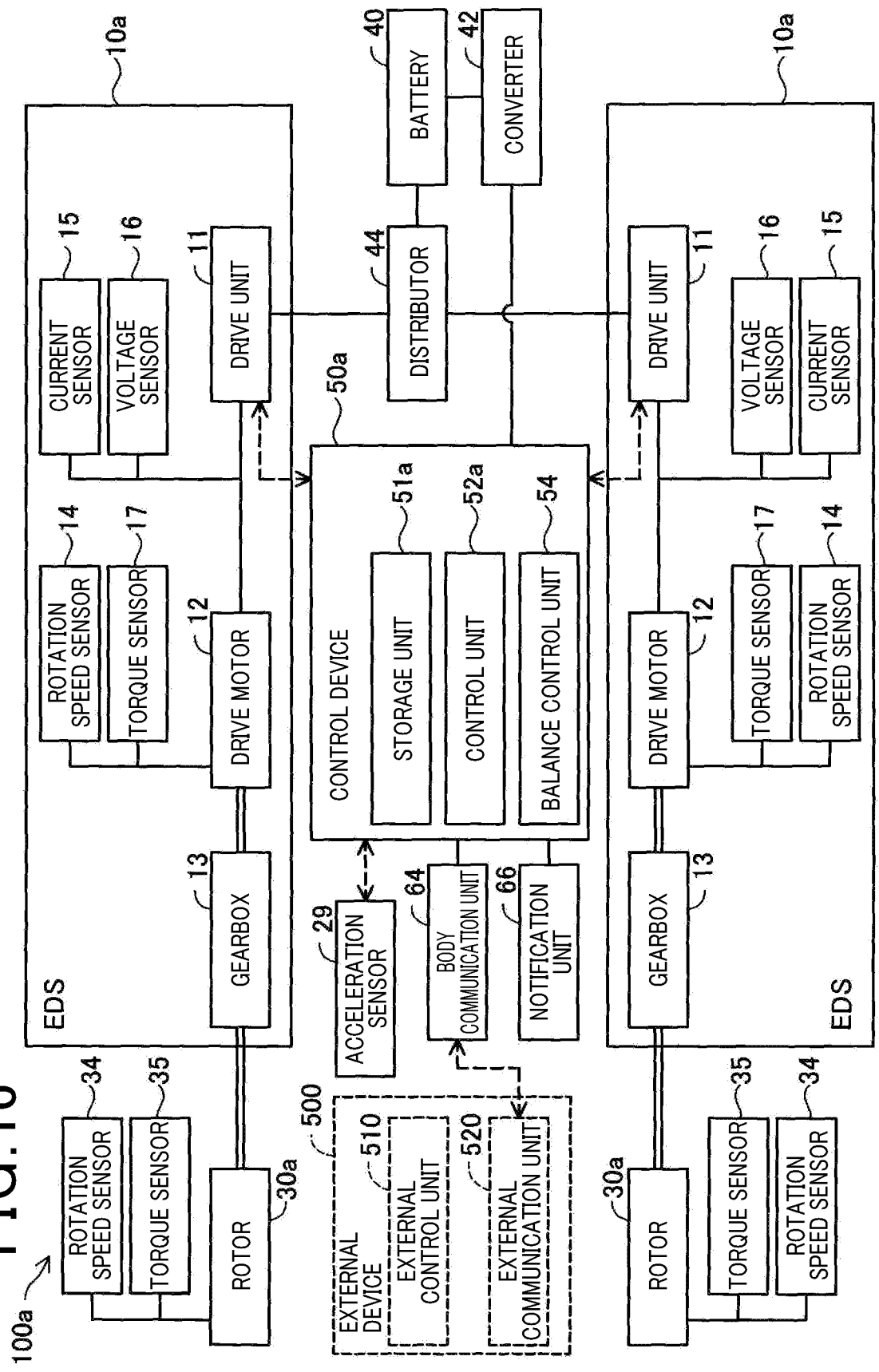
FIG. 16 is a block diagram illustrating the configuration of the electric vertical takeoff and landing aircraft.

The eVTOL 100a is driven by electricity and structured as a manned aircraft that can take off and land vertically. The eVTOL 100a includes, in addition to the control device 50a, a body 20a, a plurality of rotors 30a, and a plurality of electric drive systems 10a (hereinafter also referred to as the EDSs 10a), as well as a battery 40, a converter 42, a distributor 44, a body communication unit 64, and a notification unit 66 that are shown in FIG. 16. As shown in FIG. 14, the eVTOL 100a according to the present embodiment includes eight rotors 30a and eight EDSs 10a. In FIG. 16, of the eight rotors 30a and the eight EDSs 10a included in the eVTOL 100a, two rotors 30a and two EDSs 10a are shown as representatives for convenience of illustration.

As shown in FIGS. 14 and 15, the body 20a corresponds to the eVTOL 100a from which the eight rotors 30a and the eight EDSs 10a are removed. The body 20a includes an aircraft main body 21, a prop 22, six first supports 23, six second supports 24, main wings 25, and a tail assembly 28.

The aircraft main body 21 forms the fuselage of the eVTOL 100a. The aircraft main body 21 is bilaterally symmetrical about a body axis AX serving as the axis of symmetry. In the present embodiment, the term "body axis AX" refers to an axis passing through a body gravity center CM and extending in the front-and-rear direction of the eVTOL 100a. The term "body gravity center CM" refers to the position of the gravity center of the eVTOL 100a in an empty weight condition without a passenger. The aircraft main body 21 has an internal passenger compartment (not shown). The aircraft main body 21 is also equipped with an acceleration sensor 29. The acceleration sensor 29 is a triaxial sensor and measures the acceleration of the eVTOL 100a. The acceleration sensor 29 outputs its measurement results to the control device 50a.

The prop 22 has a substantially columnar outside shape extending in a vertical direction, and is secured on the top of the aircraft main body 21. In the present embodiment, the prop 22 is positioned at the body gravity center CM of the eVTOL 100a as viewed in a vertical direction. One end of each of the six first supports 23 is fixed to the upper end of the prop 22. The six first supports 23 each have a substantially rodlike outside shape, and are arranged radially at equal angles with respect to each other in a manner to extend along a plane orthogonal to a vertical direction. Each first support 23 has a rotor 30a and an EDS 10a placed on the other end, that is, the end positioned opposite the prop 22. The six second supports 24 each have a substantially rodlike outside shape and connect the other ends of adjacent first supports 23 (the ends not connected to the prop 22).

The main wings 25 include a right wing 26 and a left wing 27. The right wing 26 extends rightward from the aircraft main body 21. The left wing 27 extends leftward from the aircraft main body 21. The right wing 26 and the left wing 27 are each equipped with one rotor 30a and one EDS 10a. The tail assembly 28 is formed at the rear end of the aircraft main body 21.

Six of the eight rotors 30a are arranged at the ends of the second supports 24 and serve as lifting rotors 31a intended mainly to produce the lift for the body 20a. The other two of the eight rotors 30a are arranged on the right wing 26 and the left wing 27 on a one-to-one basis, and serve as cruising rotors 32a intended mainly to produce the thrust for the body 20a. The rotors 30a turn about their own rotation axes independently of each other. Each rotor 30a includes three blades 33 arranged at equal angles with respect to each other.

In the present embodiment, each rotor 30a has a variable blade angle. Specifically, the blade angle is adjusted by an actuator (not shown) in accordance with an instruction from the control device 50a. As shown in FIG. 16, each rotor 30a is provided with a rotation speed sensor 34 and a torque sensor 35. The rotation speed sensor 34 measures the rotation speed of the rotor 30a. The torque sensor 35 measures the rotational torque of the rotor 30a. The sensors 34 and 35 output their measurement results to the control device 50a.

The eight EDSs 10a shown in FIG. 14 are configured as drive devices intended to turn the corresponding rotors 30a. Six of the eight EDSs 10a turn the corresponding lifting rotors 31a. The other two of the eight EDSs 10a turn the corresponding cruising rotors 32a.

As shown in FIG. 16, each EDS 10a includes a drive unit 11, a drive motor 12, a gearbox 13, a rotation speed sensor 14, a current sensor 15, a voltage sensor 16, and a torque sensor 17.

The drive unit 11 is configured as an electronic device including an inverter circuit (not shown) and a controller (not shown) that controls the inverter circuit. The inverter circuit is a power device such as an insulated gate bipolar transistor (IGBT) or a metal-oxide-semiconductor field-effect transistor (MOSFET), and feeds a driving voltage to the drive motor 12 at a duty ratio according to a control signal received from the controller. The controller is electrically connected to the control device 50a and sends a control signal to the inverter circuit in accordance with a command from the control device 50a.

The drive motor 12 in the present embodiment is a brushless motor and outputs the rotational motion corresponding to the voltage and the current fed from the inverter circuit in the drive unit 11. It is noted that the brushless motor may be replaced with any motor such as an induction motor or a reluctance motor.

The gearbox 13 physically connects the drive motor 12 and the rotor 30a. The gearbox 13 includes multiple gears (not shown), and decelerates and transmits the rotation of the drive motor 12 to the rotor 30a. It is noted that the gearbox 13 may be removed, and the drive motor 12 may be connected directly with the rotational shaft of the rotor 30a.

The rotation speed sensor 14 and the torque sensor 17 are installed on the drive motor 12, and measure the rotation speed and the rotational torque of the drive motor 12, respectively. The current sensor 15 and the voltage sensor 16 are installed between the drive unit 11 and the drive motor 12, and measure driving currents and driving voltages, respectively. The sensors 14 to 17 output their measurement results to the control device 50a via the drive unit 11.

The battery 40 includes lithium ion cells and functions as a power source for the eVTOL 100a. The battery 40 mainly feeds electricity to the drive unit 11 included in each EDS 10a to drive the corresponding drive motor 12. The lithium-ion cells may be replaced with any secondary cells such as nickel metal hydride cells. In place of the battery 40 or in addition to the battery 40, any power source such as a fuel cell or an electric generator may be installed.

The converter 42 is connected to the battery 40, and steps down and feeds the voltage of the battery 40 to the control device 50a and the auxiliary equipment (not shown) included in the eVTOL 100a. The distributor 44 distributes the voltage of the battery 40 to the drive unit 11 included in each EDS 10a. With each EDS 10a including a power source such as the battery 40, the distributor 44 may be removed.

The control device 50a is a microcomputer including a storage unit 51a and a central processing unit (CPU), and configured as an electronic control unit (ECU). The storage unit 51a includes read only memory (ROM) and random access memory (RAM). The CPU executes the control programs prestored in the storage unit 51a to function as a control unit 52a that controls the overall operation of the eVTOL 100a and also as a balance control unit 54.

For example, the overall operation of the eVTOL 100a includes vertical takeoff and landing operations, flight operations, and a functional testing operation for each EDS 10a. The vertical takeoff and landing operations and the flight operations may be performed based on set flight path information, by passenger piloting, or based on commands from an external control unit 510 included in an external device 500 described later. In the operation of the eVTOL 100a, the control unit 52a controls the rotation speed and the rotational direction of the drive motor 12 included in each EDS 10a and the blade angle of each rotor 30a.

The balance control unit 54, as described later, performs the processing of preventing the eVTOL 100a from losing attitude balance during the functional test for each EDS 10a (hereinafter referred to as the balance control processing). The functional test for each EDS 10a is performed after an inspection of the EDS 10a such as a periodical inspection or an inspection in the event of a malfunction, or maintenance such as a replacement of a component in the EDS 10a. The test is intended to simply check the operation of the EDS 10a subjected to the inspection or the maintenance. In the present embodiment, the EDS 10a subjected to the functional test is referred to as the system under test. The functional test confirms that the system under test operates normally, and the rotor 30a turned by the system under test (hereinafter also referred to as the rotor tested) rotates normally. Specifically, in the functional test, the drive motor 12 is fed with voltage and current on a predetermined test pattern, and the resultant voltage value, current value, motor rotation speed, rotor rotation speed, and temperature are measured. The differences between the target values and the actual measurements are used to determine the normality of the system under test.

The body communication unit 64 has the function of wireless communications, which allows transmission and reception of information between the eVTOL 100a and an external communication unit 520 included in the external device 500, and also communication with the control device 50a. Examples of wireless communications include wireless communications provided by telecommunications carriers such as 4G (fourth generation wireless system) or 5G (fifth generation wireless system) wireless communications, and wireless LAN communications according to the IEEE 802.11 standard. Other examples include wired communications according to the USB (Universal Serial Bus) standard or the IEEE 802.3 standard. The external device 500 corresponds to, for example, a computer for management and control such as a server device that controls the functional test and records the test results. For example, the computer for management and control may be a server device placed in an air traffic control room or a personal computer brought to a place for use of the eVTOL 100a by a maintenance worker who performs maintenance and inspection including the functional test.

The notification unit 66 provides notification in accordance with an instruction from the control device 50a. In the present embodiment, the notification unit 66 includes a display device that is installed in the passenger compartment and displays characters and images and a speaker that outputs voice and a warning sound, and informs the passenger of various types of information through visual information and audio information.

A-2. Balance Control Processing

Figure 17:
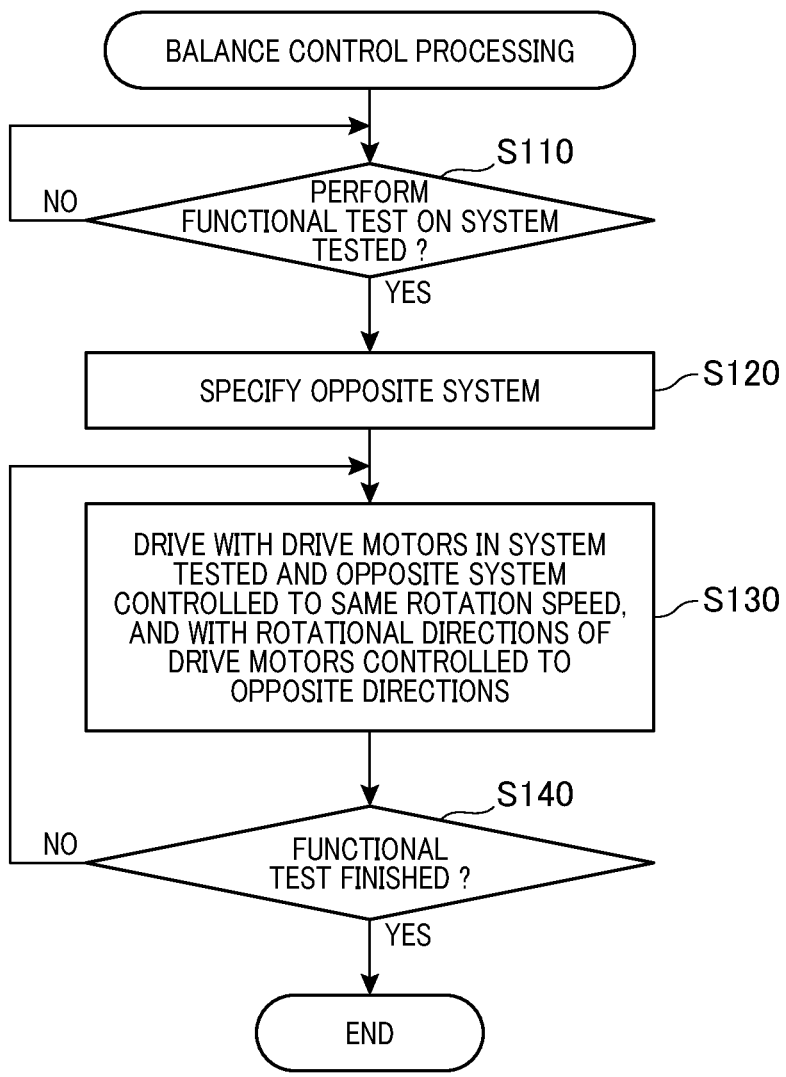
FIG. 17 is a flowchart showing the procedure of balance control processing.

The balance control processing shown in FIG. 17 is executed in parallel with the functional test on a system under test including turning the rotor tested. Each EDS 10a at the shipment of the eVTOL 100a has been subjected to tests such as a thrust measurement test at the factory or an examination site with a rotor 30a combined with the EDS 10a. Likewise, an EDS 10a that is a replacement component has also been subjected to tests such as a thrust measurement test at the factory or an examination site with a rotor 30a combined with the EDS 10a.

The balance control unit 54 detects whether a functional test will be performed on a system under test (step S110). For example, when a maintenance worker uses the external device 500 to designate a system under test and give an instruction to perform a functional test, the instruction is received at the control device 50a through wireless communications. In this case, the balance control unit 54 detects that the functional test will be performed on the system under test. In some cases with a configuration that allows the maintenance worker to input an instruction to perform the functional test through a user interface (not shown) included in the control device 50a, the balance control unit 54 may detect that the functional test will be performed on the system under test in response to the input of such an instruction. If it is detected that any functional test will not be performed (step S110: NO), step S110 is repeated. In other words, the balance control unit 54 waits until the detection that the functional test will be performed. If it is detected that the functional test will be performed (step S110: YES), the balance control unit 54 specifies the opposite system (hereinafter also referred to as the opposite system 19d) installed at the position opposite the system under test (hereinafter also referred to as the system under test 18a) (step S120).

The opposite system 19d will now be described with reference to FIG. 18. The opposite system 19d corresponds to the EDS 10a at the position opposite the system under test 18a as the eVTOL 100a is viewed in a vertical direction. Hereinafter, the rotor 30a that turns the opposite system 19d is also referred to as the opposite rotor 39.

For example, when the EDS 10a that turns the front lifting rotor 31a on the right of the eVTOL 100a is the system under test 18a, the EDS 10a that turns the rear lifting rotor 31a on the left of the eVTOL 100a corresponds to the opposite system 19d. In other words, the opposite system 19d may be the EDS 10a at the position opposite the system under test 18a in point symmetry about the body gravity center CM as the eVTOL 100a is viewed in a vertical direction. In the present embodiment, the opposite position in point symmetry refers to the position nearest to the opposite position in point symmetry.

Figure 18:
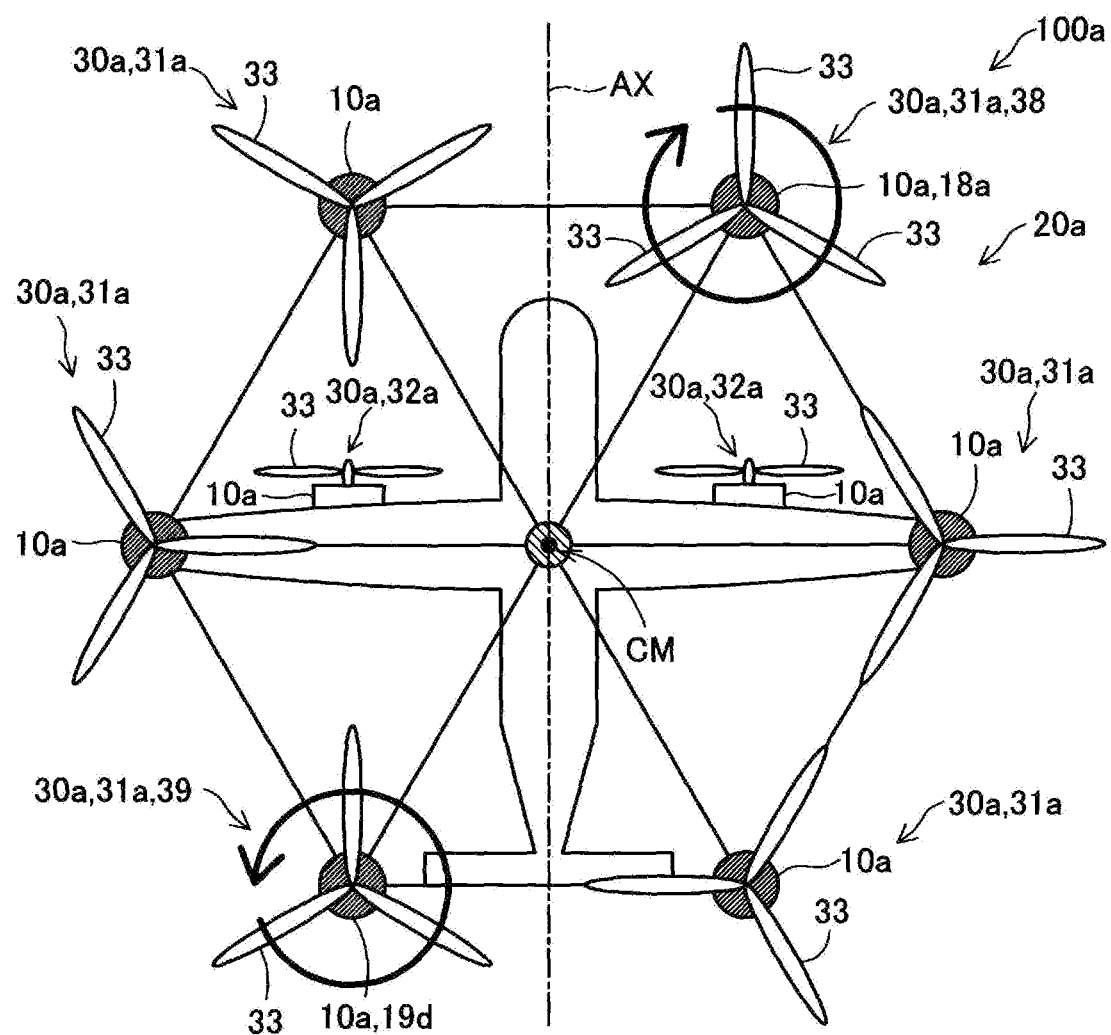
FIG. 18 is a diagram illustrating an opposite system.

In another example not indicated in FIG. 18, when the EDS 10a that turns the cruising rotor 32a installed on the right wing 26 is the system under test 18a, the EDS 10a that turns the cruising rotor 32a installed on the left wing 27 corresponds to the opposite system 19d. In other words, the opposite system 19d may be the EDS 10a at the position opposite the system under test 18a in line symmetry with respect to the body axis AX, which passes through the body gravity center CM, as the eVTOL 100a is viewed in a vertical direction. In the present embodiment, the opposite position in line symmetry refers to the position nearest to the opposite position in line symmetry.

As shown in FIG. 17, the balance control unit 54 causes the turning of a rotor tested 38 and the opposite rotor 39, while controlling the drive motors 12 in the system under test 18a and the opposite system 19d to the same rotation speed, and also controlling the rotational directions of the drive motors 12 to opposite directions (step S130).

As shown in FIG. 18, when the EDS 10a that turns the front lifting rotor 31a on the right of the eVTOL 100a is the system under test 18a, and the EDS 10a that turns the rear lifting rotor 31a on the left of the eVTOL 100a is the opposite system 19d, the balance control unit 54 controls the system under test 18a and the opposite system 19d to respectively rotate the rotor tested 38 and the opposite rotor 39 in the directions indicated by bold arrows. In the example in FIG. 18, the drive motor 12 of the system under test 18a is rotated in a clockwise direction to rotate the rotor tested 38 in the clockwise direction. The drive motor 12 of the opposite system 19d is rotated in a counterclockwise direction to rotate the opposite rotor 39 in the same direction. In the present embodiment, the same rotation speed includes the rotation frequencies of the systems 18a and 19d with an error of about 10% or less. During the functional test, it is desirable that the eVTOL 100a be fixed to, for example, ground via the legs (not shown) of the body 20a with a fixing member such as a hook or a rope. However, they may not be fixed to each other.

As shown in FIG. 17, the balance control unit 54 detects whether the functional test on the system under test 18a is completed (step S140). If detecting that the functional test is not completed (step S140: NO), the balance control unit 54 returns to step S130. If detecting that the functional test is finished (step S140: YES), the balance control unit 54 stops the operations of the system under test 18a and the opposite system 19d to end the balance control processing.

When the system under test 18a is subjected to the functional test, the control device 50a installed in the eVTOL 100a according to the present embodiment described above performs the balance control processing in which the drive motors 12 in the system under test 18a and the opposite system 19d at the position opposite the system under test 18a as the eVTOL 100a is viewed in a vertical direction are controlled to the same rotation speed, and also the rotational directions are controlled to opposite directions. As a result, when the functional test is performed, the thrust by the rotor tested 38 and the thrust by the opposite rotor 39 can be the same, and the rotational torque of the rotor tested 38 and the rotational torque of the opposite rotor 39 can be canceled. When the functional test is performed, this prevents the eVTOL 100a from rotating about the vertical axis passing through the body gravity center CM, and prevents the eVTOL 100a from losing attitude balance. Thus, the functional test may be performed without a dedicated tool for fixing the system under test 18a to ground, such as a harness.

The eVTOL 100a can take off or land at a smaller site compared with a fixed wing aircraft with a gas turbine engine, and may thus be used in various places. The control device 50a according to the present embodiment can perform a functional test on an EDS 10a without a dedicated tool, thus eliminating the need for moving the eVTOL 100a from a place for use to an examination site for the purpose of performing the functional test. This allows an EDS 10a to be subjected to a functional test at a place for use of the eVTOL 100a, preventing a deterioration in efficiency.

Furthermore, as the eVTOL 100a is viewed in a vertical direction, the EDS 10a at the position opposite the system under test 18a in point symmetry about the body gravity center CM is specified as the opposite system 19d, preventing the eVTOL 100a from rotating about the body gravity center CM. During the functional test, this effectively prevents the eVTOL 100a from losing attitude balance.

Furthermore, as the eVTOL 100a is viewed in a vertical direction, the EDS 10a at the position opposite the system under test 18a in line symmetry with respect to the body axis AX, which passes through the body gravity center CM, is specified as the opposite system 19d, preventing the eVTOL 100a from tilting about the body axis AX. During the functional test, this effectively prevents the eVTOL 100a from losing attitude balance.

Furthermore, the structure with the control device 50a installed in the eVTOL 100a eliminates the need for communication with the external device 500 during the functional test and the balance control processing, preventing an interruption of the functional test and the balance control processing caused by, for example, a communication failure.

D. Fourth Embodiment

Figure 19:
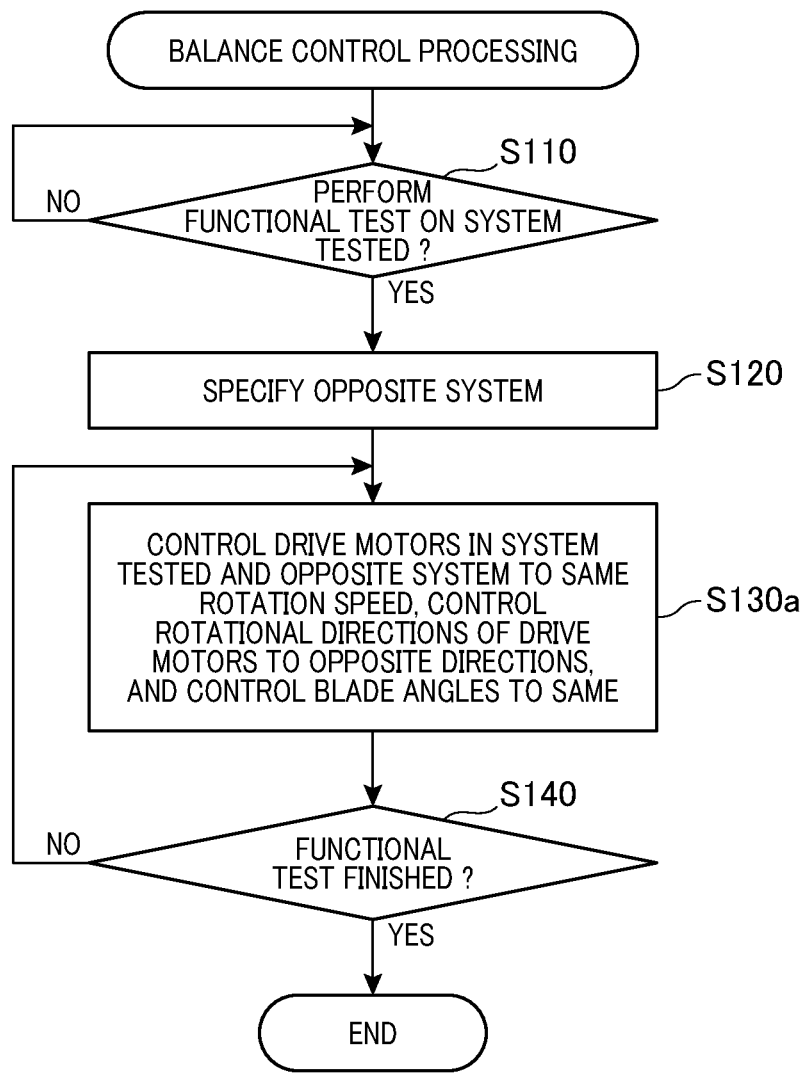
FIG. 19 is a flowchart showing the procedure of balance control processing in a fourth embodiment.

As shown in FIG. 19, a control device 50a according to a fourth embodiment is different from the control device 50a according to the third embodiment in that the balance control processing performed by the balance control unit 54 includes step S130a in place of step S130. The other components including the device configuration are the same as in the control device 50a according to the third embodiment, and thus a detailed description thereof will be omitted by using the same reference numerals to denote the same components.

After the opposite system 19d is specified in step S120, the balance control unit 54 controls the drive motors 12 in the system under test 18a and the opposite system 19d to the same rotation speed, the rotational directions of the drive motors 12 to opposite directions, and the rotor tested 38 and the opposite rotor 39 to the same blade angle (step S130a). In the present embodiment, the same blade angle includes the blade angles of the rotors 38 and 39 with an error of 10% or less of the command angle, and also includes the blade angles of the rotors 38 and 39 with a difference of about 2° or less between them. After step S130a, the processing proceeds to step S140.

The control device 50a according to the fourth embodiment described above achieves the same effects as the control device 50a according to the third embodiment does. Moreover, the control device 50a, in the balance control processing, controls the rotor tested 38 and the opposite rotor 39 to the same blade angle, thus more effectively preventing the eVTOL 100a from losing attitude balance during the functional test.

E. Fifth Embodiment

Figure 20:
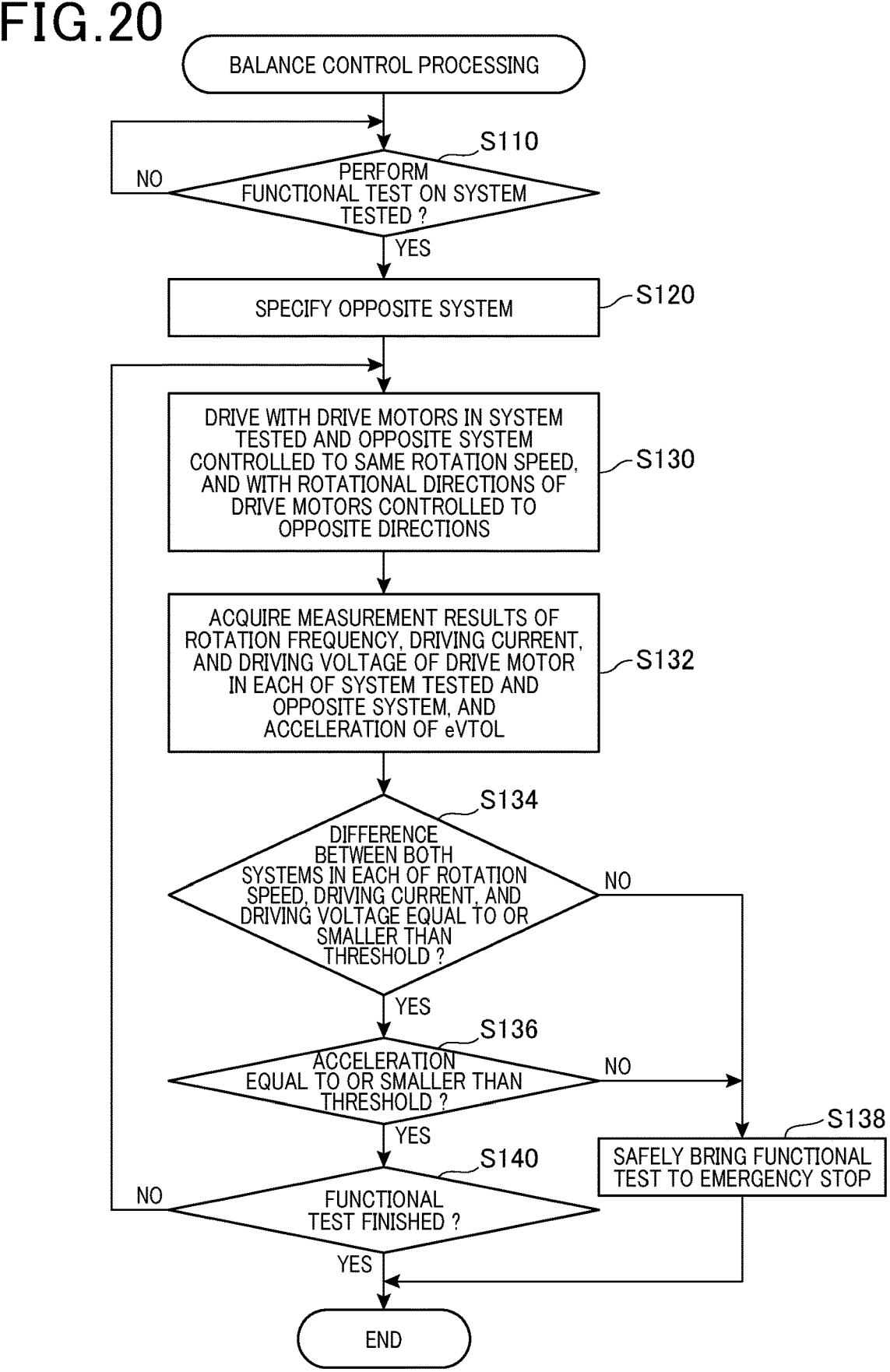
FIG. 20 is a flowchart showing the procedure of balance control processing in a fifth embodiment.

As shown in FIG. 20, a control device 50a according to a fifth embodiment is different from the control device 50a according to the third embodiment in that the balance control processing performed by the balance control unit 54 further includes steps S132, S134, S136, and S138. The other components including the device configuration are the same as in the control device 50a according to the third embodiment, and thus a detailed description thereof will be omitted by using the same reference numerals to denote the same components.

After the system under test 18a and the opposite system 19d are driven in step S130, the balance control unit 54 acquires the measurement results obtained by various sensors (step S132). More specifically, the balance control unit 54 acquires, from each of the system under test 18a and the opposite system 19d, the measurement results of the rotation speed, the driving current, and the driving voltage of the drive motor 12, and also acquires the measurement result of the acceleration of the eVTOL 100a.

As to any of the rotation frequencies, the driving currents, and the driving voltages of the drive motors 12, the balance control unit 54 determines whether the difference between the system under test 18a and the opposite system 19d is equal to or smaller than a predetermined threshold (step S134). If it is determined that all the differences between the systems 18a and 19d of the rotation frequencies, the driving currents, and the driving voltages of the drive motors 12 are not smaller than the predetermined thresholds, or in other words, at least one of the differences is determined to be greater than its threshold (step S134: NO), then the processing proceeds to step S138.

As to at least one of the rotation speed, the driving current, and the driving voltage of each drive motor 12, when the systems 18a and 19d have a large difference between their measurement result values, the eVTOL 100a may have lost attitude balance. Thus, if determining an excess over a threshold (step S134: NO), the balance control unit 54 safely brings the functional test to an emergency stop (step S138). The safe emergency stop refers to, for each of the system under test 18a and the opposite system 19d, reducing the rotation speed of the drive motor 12 gradually to stop the drive motor 12. When the functional test is brought safely to an emergency stop in step S138, the control device 50a may notify the external device 500 of the emergency stop via the body communication unit 64 or inform the passenger or the user of the eVTOL 100a via the notification unit 66. After step S138, the balance control processing is ended.

In step S134, if determining that every difference between the systems 18a and 19d of the rotation speed, the driving current, and the driving voltage of each drive motor 12 is equal to or smaller than the predetermined threshold (step S134: YES), the balance control unit 54 determines whether the acceleration of the eVTOL 100a measured by the acceleration sensor 29 is equal to or smaller than a predetermined threshold (step S136). In the case of the determination that the acceleration of the eVTOL 100a is not equal to or smaller than the predetermined threshold, or in other words, the acceleration is greater than the threshold, the eVTOL 100a may not maintain attitude balance, and for example, the eVTOL 100a may be forwarding, backwarding, rotating, or otherwise moving. Thus, if determining an excess over the threshold (step S136: NO), the balance control unit 54 performs step S138 above to safely bring the functional test to an emergency stop.

If determining that the acceleration of the eVTOL 100a is equal to or smaller than the predetermined threshold (step S136: YES), the balance control unit 54 determines that the eVTOL 100a maintains attitude balance, and continues the functional test. The balance control unit 54 detects whether the functional test is finished (step S140). If detecting that the functional test is not finished (step S140: NO), the balance control unit 54 returns to step S130. If detecting that the functional test is finished (step S140: YES), the balance control unit 54 stops the operations of the system under test 18a and the opposite system 19d to end the balance control processing.

The control device 50a according to the fifth embodiment described above achieves the same effects as the control device 50a according to the third embodiment does. In addition, when the eVTOL 100a is estimated to have lost attitude balance during the functional test, the functional test is safely brought to an emergency stop, thus maintaining safety.

Furthermore, of any of the rotation speed, the driving current, and the driving voltage of each drive motor 12, when the difference between the system under test 18a and the opposite system 19d is determined to be greater than the threshold, the functional test is safely brought to an emergency stop. Thus, the functional test can be stopped when the lost attitude balance of the eVTOL 100a is estimated with high accuracy. Furthermore, when the acceleration of the eVTOL 100a is determined to be greater than the predetermined threshold, the eVTOL 100a is determined not to maintain attitude balance. Thus, the functional test can be stopped when the lost attitude balance of the eVTOL 100a is estimated with high accuracy.

F. Modified Embodiments

F-1. Modified Embodiment 1

In the functional test in each embodiment, the body control device 50 issues a command of the output rotation speed of the motor, and the drive control unit 191 of the control device 19 drives the drive motor 12. However, the present disclosure is not limited thereto. In the functional test, the control device 19 may control the drive motor 12 in accordance with a functional test program preset in its own storage unit 19b. In this embodiment, the body control device 50 may send the control device 19 a command to perform the test in place of command values such as a rotation speed. In response to the receipt of the command from the body control device 50, the control device 19 may control the drive motor 12 in accordance with the functional test program.

F-2. Modified Embodiment 2

In the first embodiment, measurement data from each sensor is obtained from the EDS 10 or the rotor 30. However, the present disclosure is not limited thereto. The measurement data may be obtained from a sensor configured as a device other than the EDS 10 and the rotor 30.

F-3. Modified Embodiment 3

In the second embodiment, the thrust related value sensor unit 73 of the harness 70 incorporates the thrust sensor that measures the thrust of the EDS 10 in the system under test. However, in this embodiment, the harness 70 may not include any thrust sensor. For example, as in the first embodiment, the EDS 10 may include the thrust sensor 18, and the harness 70 may not include any thrust sensor.

F-4. Modified Embodiment 4

In the embodiments described above, the input-output interface 19c is included corresponding to the transmission interface that allows measurement results to be sent to outside. However, the present disclosure is not limited thereto. In this embodiment, the input-output interface corresponding to the transmission interface may not be included. In such a configuration, the EDS 10 may include a display on which measurement results may appear.

F-5. Modified Embodiment 5

In the embodiments described above, the control device 19 includes the measurement result acquisition unit 192, the pass/failure determination unit 193, and the thrust estimated value calculation unit 194. However, the present disclosure is not limited thereto. A device configured as a device other than the control device 19 may acquire measurement results, determine the pass or fail, and calculate the thrust estimated value.

F-6. Modified Embodiment 6

In the embodiments described above, the EDS 10 includes the rotation speed sensor 14 corresponding to the rotation speed measurement unit, and the thrust sensor 18 corresponding to the thrust measurement unit. However, these units may not be included. A device configured as a device other than the EDS 10 may measure the rotation speed and the thrust of the drive motor 12.

F-7. Modified Embodiment 7

In the embodiments described above, the storage unit 19*b* that stores measurement results is included. However, the present disclosure is not limited thereto. In this embodiment, the storage unit may not be included. In such a configuration, a device configured as a device other than the control device 19 may include a storage unit that stores measurement results.

F-8. Modified Embodiment 8

In the embodiments described above, the pass/failure determination unit 193 determines the pass or fail using various parameters such as thrust, motor rotation speed, current, and voltage. However, the present disclosure is not limited thereto. In this embodiment, for example, the pass/failure determination unit 193 may determine the pass or fail by using the thrust alone or using all the parameters. Alternatively, the pass/failure determination unit 193 may determine the pass or fail by using a combination of any number of parameters.

F-9. Modified Embodiment 9

In the fifth embodiment described above, the rotation speed, the driving current, and the driving voltage of the drive motor 12 in each of the system under test 18*a* and the opposite system 19*d* and the acceleration of the eVTOL 100*a* are used to determine whether the eVTOL 100*a* maintains attitude balance. However, in some aspects, some of these values may be used for the determination. In such an aspect, the balance control unit 54 may acquire at least one measurement result of the rotation speed, the driving current, and the driving voltage of the drive motor 12 and the acceleration of the eVTOL 100*a*. In this way as well, the same effects are achieved as in the fifth embodiment.

F-10. Modified Embodiment 10

The control device 50*a* according to each of the above-described embodiments is installed in the eVTOL 100*a*. However, in some aspects, the control device 50*a* may be installed and used in the external device 500. In such an aspect, control signals may be communicated between the external communication unit 520 and the body communication unit 64 connected to a control device installed in the eVTOL 100*a* (a control device other than the control device 50*a*). In other words, typically, the control device 50*a* may further include the external communication unit 520 capable of communicating with the body communication unit 64 included in the eVTOL 100*a*, and may be outside the eVTOL 100*a*. This configuration enables the external device 500 to control the functional test and the balance control processing for multiple eVTOLs 100*a*.

F-11. Modified Embodiment 11

The configuration of the eVTOL 100*a* according to each of the above-described embodiments is given by way of example only and may be altered variously. In one example, although the above EDSs 10*a* each include the corresponding drive unit 11, a common drive unit 11 may drive different drive motors 12. In another example, the number of rotors 30*a* or the number of EDSs 10*a* may not be eight, but may be any number more than one, and they may be installed at any positions. In yet another example, the lifting rotors 31*a* and the cruising rotor 32*a* may be replaced with tiltrotors. In still another example, the eVTOL 100*a* may not be a manned aircraft but may be an unmanned aircraft.

The present disclosure is not limited to the above-described embodiments but may be implemented in various manners without departing from the spirit and scope thereof. For example, the technical features in each embodiment corresponding to the technical features in the aspects described in the Summary section may be replaced or combined as appropriate so as to solve some or all of the above-described problems or achieve some or all of the above-described effects. Unless described herein as being necessary, the technical features may be deleted as appropriate.

The control unit and its technique described in the present disclosure may be implemented by a special purpose computer including memory and a processor programmed to execute at least one function embodied by a computer program. Alternatively, the control unit and its technique described in the present disclosure may be implemented by a special purpose computer including a processor formed of at least one dedicated hardware logic circuit. Alternatively, the control unit and its technique described in the present disclosure may be implemented by at least one special purpose computer including a combination of memory and a processor programmed to execute at least one function and a processor formed of at least one hardware logic circuit. The computer programs may be stored in a non-transitory, tangible computer readable storage medium as instructions executed by a computer.

What is claimed is:

1. A control device for controlling an electric drive system mounted on an electric vertical takeoff and landing aircraft including a rotor, the electric drive system including a drive motor configured to turn the rotor, and the control device comprising a processor programmed to control the electric drive system to operate selectively in a normal mode or a functional test mode, wherein in the normal mode, which is an operation mode for flying the aircraft, the processor controls the drive motor in accordance with a command from a body control device configured to control flight of the aircraft, and in the functional test mode, which is an operation mode for verifying normality of the electric drive system while the aircraft is on the ground, the processor controls the drive motor to turn the rotor and thereby generate thrust while the aircraft is on the ground in accordance with (i) a command sent from outside according to a functional test program or (ii) the functional test program preset in the control device.

2. The control device according to claim 1, wherein the processor is further programmed to:
acquire at least one measurement result of rotation speed, driving current, driving voltage, and thrust of the drive motor; and
use the acquired at least one measurement result to determine pass or fail of the functional test.

3. The control device according to claim 2, wherein
the electric drive system includes a rotation speed measurement unit configured to measure the rotation speed, and
the processor is further programmed to acquire, during the functional test mode, a measurement result of the rotation speed from the rotation speed measurement unit.

4. The control device according to claim 2, wherein
the electric drive system further includes a thrust measurement unit configured to measure the thrust of the drive motor,
the processor is further programmed to acquire, during the functional test mode, a measurement result of the thrust from the thrust measurement unit, and
the processor is further programmed to use a thrust estimated value, which is an estimated value of the thrust in the functional test mode, and the acquired measurement result of the thrust to determine pass or fail of the functional test.

5. The control device according to claim 4, wherein
the processor is further programmed to calculate the thrust estimated value based on atmospheric density, a command value of the rotation speed to the drive motor, and an installation angle of the rotor.

6. The control device according to claim 4, further comprising:
an input interface configured to allow receipt of the thrust estimated value from outside.

7. The control device according to claim 2, wherein
the electric drive system includes a mechanical connection unit configured to connect directly or indirectly, via a body of the aircraft, to a harness fixed on the ground and capable of holding the electric drive system in a direction of the thrust generated during the functional test mode.

8. The control device according to claim 7, wherein
the electric drive system includes an input interface allowing receipt of a measurement result from a thrust measurement device placed in the harness and configured to measure the thrust of the drive motor during the functional test mode, and
the processor is programmed to acquire the measurement result of the thrust received through the input interface.

9. The control device according to claim 1, wherein
the processor is further programmed to acquire at least one measurement result of rotation speed, driving current, driving voltage, and thrust of the drive motor, and
the control device comprises a memory configured to store at least one of a command value to the drive motor, the acquired at least one measurement result, and a pass/failure result of the functional test.

10. The control device according to claim 1, wherein
the processor is further programmed to acquire at least one measurement result of rotation speed, driving current, driving voltage, and thrust of the drive motor, and
the control device comprises a transmission interface configured to allow at least one of a command value to the drive motor, the acquired at least one measurement result, and a pass/failure result of the functional test to be sent to outside through the transmission interface included in the electric drive system.

11. A control device for an electric vertical takeoff and landing aircraft including a plurality of electric drive systems each including a drive motor configured to turn a rotor, the plurality of electric drive systems comprising:
a system under test, which is one of the plurality of electric drive systems; and
an opposite system, which is another of the plurality of electric drive systems that is, with respect to the system under test, in (i) a point symmetrical position about a body gravity center of the aircraft as a symmetrical center or (ii) in a line symmetrical position with an axis of symmetry being a body axis passing through the body gravity center as the aircraft is viewed in a vertical direction, wherein
when the system under test is subjected to a functional test on the ground, which includes turning the rotor of the system under test while the aircraft is on the ground, a processor of the control device is programmed to perform balance control processing for (i) controlling the drive motors in the system under test and the opposite system to an identical rotation speed and (ii) controlling rotational directions of the drive motors to opposite directions.

12. The control device for an electric vertical takeoff and landing aircraft according to claim 11, wherein
the opposite system is, as the aircraft is viewed in the vertical direction, the electric drive system of the plurality of electric drive systems at a position opposite the system under test in point symmetry about the body gravity center.

13. The control device for an electric vertical takeoff and landing aircraft according to claim 11, wherein
the opposite system is, as the aircraft is viewed in the vertical direction, the electric drive system of the plurality of electric drive systems at a position opposite the system under test in line symmetry with respect to the body axis passing through the body gravity center.

14. The control device for an electric vertical takeoff and landing aircraft according to claim 11, wherein
the rotors each include a blade having a variable blade angle,
the rotor turned by the system under test is a rotor tested,
the rotor turned by the opposite system is an opposite rotor, and
in the balance control processing, the processor is programmed to control the blade angle of the rotor tested and the blade angle of the opposite rotor to an identical angle.

15. The control device for an electric vertical takeoff and landing aircraft according to claim 11, wherein
in the balance control processing, the processor is programmed to acquire, for each of the system under test and the opposite system and during the functional test mode, at least one measurement result of rotation speed, driving current, and driving voltage of the drive motor, and to compare the measurement result acquired for the system under test and the measurement result acquired for the opposite system to determine whether the electric vertical takeoff and landing aircraft maintains attitude balance.

16. The control device for an electric vertical takeoff and landing aircraft according to claim 15, wherein
in the balance control processing, in response to determining that the balance is not maintained, the processor is programmed to gradually reduce the rotation speed of the drive motor in each of the system under test and the opposite system to stop the drive motors.

17. The control device for an electric vertical takeoff and landing aircraft according to claim 11, wherein
in the balance control processing, the processor is programmed to acquire, during the function test mode, acceleration of the aircraft and to use the acquired acceleration to determine whether the electric vertical takeoff and landing aircraft maintains attitude balance.

18. The control device for an electric vertical takeoff and landing aircraft according to claim 11, further comprising:
an external communication unit capable of communicating with a body communication unit included in the aircraft, wherein
the control device is outside the aircraft.

19. An electric vertical takeoff and landing aircraft comprising:
the control device for an electric vertical takeoff and landing aircraft according to claim 11.

* * * * *